(12) United States Patent
Peter

(10) Patent No.: US 11,311,143 B2
(45) Date of Patent: Apr. 26, 2022

(54) HOUSEHOLD APPLIANCE OR COMMERCIAL APPLIANCE AND CARRIER SYSTEM THEREFOR

(71) Applicant: Miele & Cie. KG, Gütersloh (DE)

(72) Inventor: Sarah Peter, Dorsten (DE)

(73) Assignee: Miele & Cie. KG, Gütersloh (DE)

(*) Notice: Subject to any disclaimer, the term of this patent is extended or adjusted under 35 U.S.C. 154(b) by 20 days.

(21) Appl. No.: 16/850,368

(22) Filed: Apr. 16, 2020

(65) Prior Publication Data
US 2020/0337496 A1    Oct. 29, 2020

(30) Foreign Application Priority Data

| Apr. 24, 2019 | (DE) | 10 2019 110 605.2 |
| Jun. 12, 2019 | (DE) | 10 2019 115 976.8 |
| Jun. 14, 2019 | (DE) | 10 2019 116 189.4 |

(51) Int. Cl.
| *A47J 36/34* | (2006.01) |
| *A47J 27/04* | (2006.01) |
| *A47L 15/42* | (2006.01) |
| *F24C 15/16* | (2006.01) |
| *F25D 25/02* | (2006.01) |

(52) U.S. Cl.
CPC .............. *A47J 36/34* (2013.01); *A47J 27/04* (2013.01); *A47L 15/4246* (2013.01); *A47L 15/4251* (2013.01); *F24C 15/168* (2013.01); *F25D 25/024* (2013.01); *A47J 2027/043* (2013.01)

(58) Field of Classification Search
CPC ....... A47L 15/4246; A47J 27/04; A47J 36/34; F25D 25/024; F24C 15/168
USPC .......... 312/333, 334.1, 410; 126/337 R, 339; 211/153
See application file for complete search history.

(56) References Cited

U.S. PATENT DOCUMENTS

| 6,244,678 B1 * | 6/2001 | Dopp | A47B 88/467 |
| | | | 312/333 |
| 6,817,685 B2 * | 11/2004 | Lammens | A47B 88/493 |
| | | | 312/333 |
| 7,458,651 B1 * | 12/2008 | Radke | A47B 88/467 |
| | | | 312/333 |

(Continued)

FOREIGN PATENT DOCUMENTS

| DE | 19951267 A1 | 5/2001 |
| DE | 102008035078 A1 | 9/2009 |

(Continued)

*Primary Examiner* — James O Hansen
(74) *Attorney, Agent, or Firm* — Dickinson Wright PLLC

(57) ABSTRACT

A household appliance or commercial appliance includes a housing surrounding an interior and a support device removable from the interior and a rail system with at least two rails connected to one another and movable relative to one another, and a support element. When the support device is in an installed state, the rail system is mounted on the housing such that the support element is movable relative to the housing by pulling out the rail system. A locking unit arranged on the support device has at least one locking element that can be transferred between a blocking state and a free state. When the support device is in its removed state physically separated from the housing, the locking unit blocks the rail system from being pulled out. When the support device is in its installed state, the locking element allows the rail system to be pulled out.

13 Claims, 15 Drawing Sheets

(56) References Cited

U.S. PATENT DOCUMENTS

| | | | |
|---|---|---|---|
| 8,490,801 B2* | 7/2013 | Smith | F24C 15/16 |
| | | | 211/153 |
| 9,022,496 B2 | 5/2015 | Armstrong et al. | |
| 9,408,462 B1* | 8/2016 | Hong | A47B 88/57 |
| 2006/0065265 A1* | 3/2006 | Erdmann | F24C 15/16 |
| | | | 126/339 |
| 2012/0097147 A1* | 4/2012 | Steurer | F24C 15/16 |
| | | | 126/339 |
| 2012/0138041 A1* | 6/2012 | Jahrling | F24C 15/168 |
| | | | 126/19 R |

FOREIGN PATENT DOCUMENTS

| | | |
|---|---|---|
| FR | 2608905 A1 | 7/1988 |
| WO | 2002/033325 A1 | 4/2002 |
| WO | 2014056764 A1 | 4/2014 |

* cited by examiner

HOUSEHOLD APPLIANCE OR COMMERCIAL APPLIANCE AND CARRIER SYSTEM THEREFOR

TECHNICAL FIELD

The invention relates to a household appliance or commercial appliance for cleaning, storing or cooking items, comprising a housing formed by walls spatially surrounding an interior and at least one support device which is removable from the interior, wherein the support device comprises at least one rail system with at least two rails which are connected to one another and movable relative to one another, and at least one support element, wherein when the support device is present in an installed state the rail system is mounted on the housing in a force-transmitting manner in such a way that the support element is movable relative to the housing by pulling out the rail system, wherein a locking unit arranged on the support device and comprising at least one locking element be transferred between a blocking state and a free state, wherein, when the support device is present in its removed state in which the support device is physically separated from the housing, the locking unit is present in its blocking state, in which, by forming a positive engagement, the locking element blocks the rail system from being pulled out, and wherein, when the support device is present in its installed state, the locking unit is present in its free state, in which the locking element allows the rail system to be pulled out.

BACKGROUND

The household appliance or the commercial appliance in the sense of the present application is suitable for cleaning, storing or cooking at least one item. A corresponding household appliance can be formed in particular by a dishwasher, a refrigerator, an oven or a steam cooker. The household appliance can in particular be a built-in household appliance. The commercial appliance can in particular be formed by a professional refrigerator, a professional dishwasher, a professional oven or a professional convection oven, which are intended, for example, for use in canteen kitchens or the catering trade.

The household appliance or the commercial appliance comprises a housing formed by walls, by means of which an interior is spatially surrounded. Using the example of an oven, the interior is formed by a cooking chamber. The housing can be a supporting housing, but can also be formed by the walls that surround the interior. Furthermore, the appliance in question comprises a support device which can be removed from the housing. The latter in turn comprises at least one rail system and at least one support element. The rail system has at least two rails which are connected to one another and are movable relative to one another. In particular, it can be formed by a telescopic extension. The support element interacts with one of the rails of the rail system. It serves to receive at least one item. For example, in an appliance designed as a refrigerator the support element can be formed by a shelf, in an appliance designed as an oven, for example, it can be formed by a rack or baking sheet, and in a dishwasher by a rinsing basket. In this way, the support device is prepared to move the support element out of the interior and thus relative to the housing without having to remove the support device itself from the housing. Thus, when the support device is present in an installed state, the rail system is mounted on the housing in a force-transmitting manner. Especially in the case of larger appliances, the interior of which has a clear width between the mutually opposing walls of, for example, 90 cm, it is usual for the relevant support element to be rigidly connected to the associated rail system, preferably on the rail which can be pulled furthest out from the interior, and consequently the support device is removed as a whole from the appliance when the support element is removed. The fact that a relevant support device can be removed, i.e, it can be transferred from its installed state into a removed state, serves in particular to enable the support device as a whole to be cleaned outside the appliance in question. It has proven to be problematic here that the rails of the rail system can also carry out a relative movement with respect to one another when the support device is in its removed state, in which it is physically separated from the housing. In practice, this can lead to an unwanted movement of the rail system. In the case of a household appliance designed as an oven, for example, it may be dangerous if the support device is removed immediately after a cooking process and has an elevated temperature.

Appliances known from the prior art (DE 199 51 267 A1 or WO 02/033 325 A1) therefore have a locking unit which is arranged on the support device and comprises at least one locking element. The locking unit can be transferred between a blocking state and a free state, and the blocking state of the locking unit corresponds to the removed state of the support device. In this blocking state of the locking unit, the pulling-out of the rail system, i.e. the relative movement of the at least two rails of the rail system with respect to one another, is blocked, by forming a positive engagement between the locking element and a positively engaging counterpart in the known prior art. In other words when the locking unit is in its blocking state it is impossible to move the rails of the rail system relative to one another. The locking unit is also configured to be in a free state when the support device is present in its installed state. In this free state, the locking unit has no blocking effect for the support device. This means that when the locking unit is in its free state, the rail system can be pulled out. This should also be possible when the support device is in its installed state so that the pull-out mechanism of the rail system can be used as desired. As a result, when the support device is in its removed state, the locking unit prevents the rail system from being pulled out inadvertently. The known appliances are designed in such a way that the locking element can be automatically transferred from its free position to its blocking position in the course of the transfer of the support device from its installed state to its removed state, at least when the rail system was already completely retracted when the support device was removed. For this purpose, the locking element is designed such that a line of action of the weight force acting on it due to the dead weight of the locking element runs under a lever arm with respect to the axis of rotation of the locking element, so that the locking element can be transferred from its free position in the direction of a blocking position based solely on the weight force acting on it. This transfer therefore only requires the locking element to be freely rotatable relative to the support device, so that the latter automatically rotates into its blocking position. This embodiment therefore ensures that the support device is "automatically" secured in the course of its removal from the relevant household appliance or commercial appliance by moving the locking element into its blocking position and thus putting the locking unit into its blocking state. The rails of the rail system are then blocked in such a way that they cannot be inadvertently moved relative to one another. There is therefore no need for a separate action by a user of the household appliance or commercial appliance for securing the rail system. The automatic transfer of the locking element from its free position into its blocking position takes place as a result of the lack of striking of the locking element, which results from the removal of the support device from the relevant appliance. The known locking element is designed to be rotatable, it being mounted on the support device with an axis of rotation being formed. In this way, the locking element can be transferred between a blocking position and a free position, the blocking position of the locking element corresponding to the blocking state of the locking unit and, conversely, the free position of the locking element corresponding to the free state of the locking unit. In other words, if the locking element is in its blocking position, it engages in a positively engaging manner with a relevant positively engaging counterpart and in this way prevents the rails of the rail system from moving relative to one another.

In the known appliances, the locking elements are only in a blocking position if the support device in its removed state is in a usage orientation in which the support element is provided for receiving an item. In particular, the support element can be oriented horizontally when the support device is present in its usage orientation, as is customary for a baking sheet, a shelf or a rack. Since the known locking devices act due to the force of gravity, they do not lock when the support device is rotated by 180° relative to the usage orientation into a reverse orientation, i.e. "is upside down". Rotating the support device into this position is by no means uncommon when the user cleans it, for example, and so the blocking position can be released unintentionally when it is transferred to the position and then the rails can be extended when the support device is subsequently tilted. Injuries to the user or the destruction of items located in the travel path of the rails are possible.

SUMMARY

The present application is therefore based on the object of providing a household appliance or commercial appliance of which the operational safety is improved compared to the prior art, by ensuring that the inadvertent pulling-out of the rail system is blocked even in this scenario.

In a first advantageous embodiment of the invention, the advantages according to the invention are achieved in an appliance mentioned at the outset in that the locking unit comprises at least one second locking element which is rotatably arranged on the support device, the locking elements being at least indirectly assigned to different rails of the rail system. In particular, the locking elements may be configured to engage with one another in a positively engaging manner, so that they are in a blocking position when a positive engagement is made and in a free position when the positive engagement is released. The blocking state of the locking unit can be achieved by means of a plurality of blocking positions of the locking elements. In the different blocking positions, at least one of the locking elements, preferably both locking elements, is/are in different positions relative to the support device. In other words, at least one of the locking elements is rotated differently relative to the support device in the individual blocking positions. It is conceivable here, in particular, that the locking elements are present in different positions relative to the support device as a result of the weight force acting on them due to the dead weight thereof, depending on an orientation of the support device in its removed state. Due to the fact that the locking elements can be freely rotated relative to the support device, which is preferred in principle, they are exposed to the weight force acting on them, so that they change their positions relative to the support device as a result of an orientation of the latter in space. In a particularly preferred manner, the locking elements interact by positively engaging regardless of the orientation of the support device in space, so that the locking unit is in its blocking state in any case when the support device is present in its removed state. The locking elements assume different positions relative to the support device, which therefore represent the plurality of the blocking positions. In this way, when the support device in its removed state is in a usage orientation in which the support element is provided for receiving an item, the locking elements are together in a first blocking position, and when the support device in its removed state is in the reverse orientation in which the support device is rotated by 180° relative to the usage orientation, the locking elements are in a second blocking position so that, when the support device is both in its usage orientation and in its reverse orientation, the locking unit is in its blocking state in each case. A change in the orientation of the support device from the usage orientation to the reverse orientation can take place, for example, in the course of cleaning of the support device. Due to the described development of the household appliance or commercial appliance according to the invention it is ensured that the inadvertent pulling-out of the rail system is also blocked in this scenario.

If the locking elements of the locking unit are each arranged on the support device such that they can be rotated about an axis of rotation, it can be particularly advantageous if the axes of rotation of the locking elements are oriented in parallel with one another. In this way it is ensured that the locking elements are rotated in the same way depending on a direction of action of the weight force acting on them. This is advantageous with regard to a positive engagement of the locking elements with one another regardless of an orientation of the support device in space.

Furthermore, such an embodiment is particularly advantageous in which the first locking element is arranged indirectly or directly on a first rail of the rail system and the second locking element is arranged indirectly or directly on a second rail of the rail system. In a particularly preferred form, the locking elements are assigned to the two "outer ails" of a rail system, so that locking these rails together can prevent movement of the rail system as a whole. Any middle rails of the rail system are automatically included due to their connection to the outer rails.

In a second advantageous embodiment of the invention, the advantages according to the invention are achieved in an appliance mentioned at the outset in that the locking unit has at least one elongate hole along which the locking element is displaceably mounted, so that the locking element can be transferred between at least one fixed position and at least one rotational position, wherein the locking element, when present in its fixed position, is blocked in such a way that rotation of the locking element relative to the support device is at least substantially prevented, and wherein the locking element, when present in its rotational position, is rotatable relative to the support device.

For the purposes of the present invention, the prevention of rotation of the locking element "at least substantially" is understood to mean that the locking element in particular cannot be transferred into its free position in which it allows the rail system to be pulled out. A certain rotational play can nevertheless exist and is harmless to the success of the invention.

The appliance according to the invention has many advantages. In particular, the mounting of the locking element along the elongate hole makes it possible to move the locking element translationally along the elongate hole and thereby to transfer the locking element particularly simply and quickly by means of a displacement between its fixed position and the rotational position. It is provided that the locking element can be moved in its rotational position by means of rotation between its blocking position and its free position, in order to block or allow the pulling-out of the rail system. In this way, the locking unit can also be transferred indirectly between its blocking state and its free state. In the fixed position, however, such rotation is impossible, so that the pulling-out of the rail system is blocked and remains, with in particular the intention being to prevent the locking element from being inadvertently transferred into its free position. In particular, the locking element can also be moved along the elongate hole as a result of the force of gravity acting thereon, as a result of which the transfer can take place without intervention by the user of the appliance, i.e. "automatically".

The embodiment according to the invention therefore provides that the locking element is held in a fixed position along the elongate hole by the sole action of the force of gravity at least when the support device is present in its removed state, in a position in which the support device is in a usage orientation. In the usage orientation of the support device, the support element is provided for receiving an item. In particular, the support element can be oriented horizontally when the support device is present in its usage orientation, as is customary for a baking sheet, a shelf or a rack. The support device is typically present in its usage orientation, in particular in its installed state. However, it is also conceivable for the support device to be in its usage orientation in its removed state, in particular when items are arranged on the support device. In any case, the locking element according to the advantageous development is advantageously held in a fixed position solely due to the force of gravity acting thereon, as a result of which additional securing of the rail system by the user of the appliance is not required. Rather, the securing takes place "automatically". The locking element is preferably arranged in an end region of the elongate hole.

Furthermore, the configuration of the appliance according to the invention provides that, when the support device is also present in a reverse orientation, in which the support device is rotated by 180° about a horizontal axis of rotation relative to the usage orientation, the locking unit is held in a further fixed position along the elongate hole by the sole action of the force of gravity. In its reverse orientation, the support device is, so to speak, "upside down". The appliance according to the invention ensures that the inadvertent extension of the rail system is also blocked in this scenario. It is fundamentally problematic here that the force of gravity pulls the locking element in a direction opposite to the usage orientation and the locking element thus has the desire to rotate, which would result in the rail system being freed. In order to prevent the extension also in the reverse orientation of the support device, the locking element of the appliance according to the invention preferably has a plurality of fixed positions in which rotation of the locking element is at least substantially prevented. In particular, the locking element in the relevant fixed position can at least not be transferred into its free position. Extension of the rail system is therefore blocked. This functionality of the locking element is achieved by means of its movable mounting along the elongate hole, the locking element being held in its second fixed position solely as a result of the force of gravity acting thereon. In the second fixed position, the locking element is preferably arranged in a second end region of the elongate hole, which is arranged opposite the first end region of the elongate hole.

As a result, the locking unit blocks the extension of the rail system when the support device is present in its removed state, specifically when the support device is present both in a usage orientation and also in a reverse orientation. The locking element can preferably assume further fixed positions in which rotation of the locking element is also blocked. These fixed positions are preferably always assumed when the support device is not in its installed state. This can advantageously have the effect that pulling-out of the rail system is blocked even when the support device is arranged in an orientation that is between the usage orientation and the reverse orientation, i.e. when the support device is oriented "obliquely".

According to a preferred development of the appliance according to the invention, it is provided that the elongate hole is oriented perpendicularly with respect to the support plane spanned by the support element with its surface, the elongate hole preferably being oriented vertically—when the support device is present in its installed state (and thus in its usage orientation). Advantageously, the locking element can thus be moved in the elongate hole and thus can be transferred between its fixed positions in the course of the "turning over" of the support device, i.e. in the course of a transfer thereof between its usage orientation and its reverse orientation, solely as a result of the effect of the force of gravity. It is preferably provided that in the installed state, in which the support device is in its usage orientation, the locking element is transferred to a first fixed position due to the force of gravity acting on the locking element. Thus, by means of the vertical orientation of the elongate hole, the locking element can advantageously be transferred between the fixed positions solely as a result of the force of gravity acting on the locking element when the support device is rotated, for example during cleaning, into its reverse orientation or into any intermediate orientations. An axis of rotation about which the support device is rotated is preferably oriented in parallel with the support plane of the support element. As a result of the rotation, the locking element thus "slips" in the elongate hole into further fixed positions. The locking element is therefore preferably also in a fixed position when the support device is oriented "obliquely" during cleaning, for example, and is therefore in an intermediate orientation.

According to a further feature of the invention, it is provided that the elongate hole has a widening along its longitudinal axis, in the effective region of which a width of the elongate hole is greater than outside the widening, the rotational position of the locking element preferably corresponding to a positioning of the locking element in the effective region of the widening. In order to ensure that the locking element cannot be rotated outside the widening and thus cannot be moved into its free position, the width of the elongate hole outside the widening is dimensioned such that rotation of the locking element is blocked. Only in the effective region of the widening is rotation possible, so that the locking element, as a result of its transfer from its blocking position into its free position, thus allows the rail system to be pulled out.

An advantageous embodiment of the invention provides that the widening is arranged in a central region of the elongate hole. The elongate hole is advantageously symmetrical, as a result of which a displacement path of the locking element between fixed end positions and the central rotational position is thus the same. Advantageously, the locking element can thus be "quickly" transferred to its rotational position from the two fixed end positions in the installed state and in the removed state of the support device.

According to a further feature of the invention, it is provided that the locking element is guided in the elongate hole by means of a partial bolt, a cross section of the partial bolt preferably being formed by a partial circular surface. It is preferably provided that the partial bolt has a semicircular cross section, the diameter of which is greater than the width of the elongate hole outside its widening, the radius of the cross section corresponding approximately to the width. This enables the partial bolt to move along the elongate hole with a suitable alignment of the partial bolt, but rotation is blocked because the partial bolt can make a positive engagement in the elongate hole, which at least substantially prevents the locking element from being rotated. The rotation of the locking element is only possible if the partial bolt is arranged in the effective region of a widening of the elongate hole. In this case, the widening is preferably formed on one side of the elongate hole and has a semicircular surface which corresponds approximately to the cross section of the partial bolt, so that the partial bolt can be rotated in the event that it is arranged in the effective region of the widening. This enables the locking element to be transferred from its blocking position to its free position. The partial bolt is preferably arranged in the elongate hole in such a way that a flat surface of the partial bolt runs in parallel with a side surface of the elongate hole in which the widening is arranged. As a result, the partial bolt can be "screwed" into the widening when it is rotated.

A further preferred embodiment of the invention provides that the locking unit comprises a guide device, by means of which the locking element can be guided, preferably automatically, along the elongate hole into its rotational position in the course of the transfer of the support device into its installed state. The locking element can thus be moved along the elongate hole under the action of the guide device. Such a coupling of the locking element to the guide device is particularly advantageous with regard to the transfer of the locking element into its rotational position, the guide device preferably being configured in such a way that the installation of the support device in the housing automatically actuates the guide device and thereby causes the transfer of the locking element into its rotational position. This can take place in particular by means of the guide device striking a striking surface of the housing, for example a receiving unit arranged in the housing, which serves to receive the support device.

A particularly preferred development of the appliance according to the invention provides a receiving unit, which is arranged in a force-transmitting manner on the housing and is suitable for receiving the support device, the support device preferably being able to be placed on a bearing surface of the receiving unit. The receiving unit can in particular be formed by a plurality of rod-shaped struts which are connected to one another. In an appliance designed as an oven, the receiving unit is formed, for example, in the form of horizontal struts which are arranged in pairs on the side walls of said appliance and are connected by means of vertical struts. The receiving surface is preferably formed by a horizontal strut on each side wall. According to a preferred development, it is provided that a guide device of the locking unit can strike the receiving unit during the transfer of the support device into its installed state, as a result of which the locking element coupled to the guide device can be transferred into its rotational position along the elongate hole. This ensures that the locking element can be transferred from its fixed position into its rotational position without any special action by the user, i.e. "automatically". It is preferably provided that a partial bolt of the locking element is arranged in a force-transmitting manner on the guide device, so that a movement of the guide device in the course of the transfer of the support device into its installed state is transmitted to the partial bolt, as a result of which the latter can be moved along the elongate hole and in particular into an effective region of a widening, and when this is reached the locking element is in its rotational position.

Furthermore, it is particularly advantageous if the locking element comprises at least one striking section which projects beyond the support device in such a way that the locking element directly or indirectly strikes the housing during the transfer of the support device into its installed state. As a result of the striking section striking the housing, the locking element is rotated if the locking element is in its rotational position. It is preferably provided that, in the course of the installation of the support device in the housing, the locking element is first transferred into its rotational position by means of a guide device along the elongate hole, in which position a rotation of the locking element relative to the support device is made possible. In addition—and in particular afterwards—the striking section of the locking element strikes the housing, so that the locking element is rotated and thus transferred from its blocking position to its free position, thereby allowing the extension of the rail system. The locking element can in particular strike a receiving unit which is arranged in the housing.

According to a further feature of the invention, it is provided that the locking element has a hook section, by means of which the locking element, when the locking unit is present in its blocking state, engages indirectly or directly with the supporting element in a positively engaging manner. As a result of the form-fit, pulling-out of the rail system is blocked. It is preferably provided that the locking unit is indirectly or directly assigned to a rail of the rail system, preferably a lower rail, while the support element is preferably also indirectly or directly assigned in a force-transmitting manner to a rail of the rail system, but preferably an upper rail. In other words, the locking element is arranged on a different rail than the support element, so that when there is a positive engagement between the locking element and the support element, extension of the rail system is thus blocked.

In a third advantageous embodiment of the invention, the advantages according to the invention are achieved in an appliance mentioned at the outset in that the locking element is at least partially elastically deformable, in the course of the transfer of the support device from its removed state to its installed state, as a result of indirectly or directly striking the housing, as a result of which the locking element can be automatically transferred from its blocking state into its free state.

The household appliance or commercial appliance according to the invention has many advantages. In particular, the locking element is transferred from its blocking state into its free state automatically when the support device is transferred from its removed state to its installed state, i.e. without the direct involvement of the user of the household appliance or commercial appliance. This configuration has the advantage that the user of the household appliance or commercial appliance does not have to intervene himself in order to bring about the free state of the locking element, but nevertheless the rail system is secured against inadvertent pulling-out when the support device is present in its removed state. The support device is typically held in the housing by striking the housing. Due to the fact that the locking element is deformable as a result of the striking, the locking element is thus transferred from the blocking state into the free state during an action which the user takes in any case in the course of using the support device, namely in the course of installing the support device in the relevant household or commercial appliance.

The locking element is transferred from its blocking state into its free state by the at least partial elastic deformability of the locking element. In the context of the present invention, elastic deformability is understood to mean the ability of a body to return to its original shape independently after the action of an external force. This configuration has the advantage that the locking element can be transferred from its blocking state to its free state any number of times—irrespective of certain signs of wear and tear—and returns to the blocking state independently, that is, without the direct involvement of the user. This significantly increases safety, since accidentally forgetting to lock the rail system is impossible. A particular advantage of the embodiment of the household appliance or commercial appliance according to the invention is that the locking element functions in the removed state of the support device, regardless of the position in which the support device is held, be it in the usage orientation, i.e. if the support device is held in such a way that the support element is located above the rails, or if the support device is rotated by 180° relative to the usage orientation, i.e. "upside down".

According to an advantageous embodiment of the invention, it is provided that the locking element can be transferred from its blocking state into its free state solely as a result of the weight force acting on the locking element due to the dead weight of the support device. This configuration has the advantage that no additional elements are required to transfer the locking element from its blocking state into its free state. Furthermore, the user of the household appliance or commercial appliance does not have to intervene himself in order to bring the locking element into the free state. The locking element is preferably deformable as a result of the weight force acting thereon and can thereby be transferred into its free state. This can be implemented, for example, in that at least one holding section of the locking element runs on a lower face of the support device, so that when the support device is placed on a bearing part, the holding section inevitably strikes a surface of the bearing part and, due to the dead weight of the support device, is squeezed to a certain extent between the bearing part and the support device and is pressed elastically upwards. As a result of this pushing upward, an at least indirect positive engagement of the locking element with a relevant rail of the rail system can be released and the locking element can thus be transferred into its free state. This deformation is reversed as soon as the support device is lifted from the bearing part and thus transferred to its removed state. The locking element will then automatically move back into its blocking state. A corresponding configuration is explained in the embodiment below.

A preferred embodiment of the invention provides that the household appliance or commercial appliance comprises at least one receptacle arranged on the housing, preferably on a side wall of the housing, which preferably has at least one bearing surface for bearing the support device. The support device can be held in the household appliance or commercial appliance by means of the receptacle. As a rule, the known household appliances and commercial appliances are equipped with receptacles which have a plurality of receiving regions which are arranged at a distance from one another, so that the support device can be arranged at different distances from a lower base surface of the housing. In the case of a household appliance or commercial appliance designed as an oven, the receptacle of a household appliance or commercial appliance can be formed, for example, by guide rods typically arranged in the interior for receiving a baking sheet, the lower guide rod of the receptacles forming a bearing surface on both side walls for bearing the support device. The associated upper guide rod, on the other hand, serves to secure the support device in the event that the support device threatens to "tip" as a result of an asymmetrical placement of items on the support device. Such a receptacle enables a particularly simple fastening of the support device to the housing, the receptacle preferably forming the stop for transferring the locking unit from its free state into its blocking state.

An advantageous embodiment of the invention provides that, in the course of the transfer of the support device into its installed state, the locking element can be elastically deformed by means of the support device bearing on the bearing surface of the receptacle and thereby the locking unit can be transferred from its blocking state into its free state.

Advantageously, the process of inserting the support device into the household appliance or commercial appliance for the user does not differ from the prior art. As a result, the user does not have to take any additional actions to transfer the locking unit into its free state. It is preferably provided that the locking unit is transferred from its blocking state into its free state by means of the weight force acting on the locking element due to the dead weight of the support device as soon as the support device rests on the bearing surface of the receptacle.

A particularly advantageous development of the household appliance or commercial appliance according to the invention provides that, in the course of the transfer of the support device into its removed state and the associated cessation of the locking element striking the housing, the locking unit can be transferred automatically from its free state into its blocking state by a restoring force stored in the locking element as a result of the elastic deformation. Advantageously, the locking unit is therefore also transferred from its free state into its blocking state automatically and without any intervention by the user of the household appliance or commercial appliance. This means that the user does not have to take any further action in order to transfer the locking unit from its free state into its blocking state. With regard to the handling of, for example, heated receiving elements, such an embodiment can be particularly advantageous since the user is thereby at least not directly involved in the transfer and can safely remove items, in particular food, heated by means of the oven from the oven without the risk of being hindered by the divergence of the rails.

According to a preferred embodiment of the invention, the locking element has a fastening section and a holding section, the holding section in the blocking state of the locking element engaging around at least part of the support element in a positively engaging manner. The fastening section is used here to fasten the locking element to the support device, while the holding section secures the rail system against being inadvertently pulled out. The holding section of the locking element preferably forms a positive engagement with a positively engaging counterpart. It is conceivable that the locking element is a spring element and is at least indirectly assigned to one of the rails of the rail system. The locking element is preferably shaped in such a way that the fastening section is provided for fastening the locking element to the support device, preferably to a lower rail of the rail system. The holding section is preferably shaped in such a way that the support element, which is assigned to another rail of the rail system; preferably an upper rail, can be gripped by form-fitting. In the event that the support element is a rack, it is preferably provided that the holding section engages in a positively engaging manner around at least one rod of the rack which forms the positively engaging counterpart. When in its blocking state, the locking element consequently connects the rails of the rail system in a force-transmitting manner, as a result of which inadvertent pulling-out of the rail system is prevented as desired.

The described embodiment is also particularly advantageous if a deformation path which the locking element travels in an elastic manner in the course of the transfer of the support device from its removed state into its installed state and vice versa exceeds an engagement depth of the locking element on the support element. This embodiment ensures that an elastic movement space of the locking element is suitable for alternately blocking and freeing the support element—and thus the rail of the rail system assigned to it.

In the course of the transfer of the support device from its removed state into its installed state, the fastening section is preferably deformed such that the support element is released from the holding section. For example, the release takes place in that the locking element can be deflected against the weight force due to the weight force of the support device acting on it, for example by means of squeezing the locking element between the support device and a bearing part. It is provided that the deflection path is dimensioned such that the support element is released thereby.

According to a preferred embodiment of the invention, the locking element is arranged indirectly or directly on a rail of the rail system. Such an arrangement enables a particularly simple fastening of the locking element to the support device.

In a fourth advantageous embodiment of the invention, the advantages according to the invention are achieved in an appliance mentioned at the outset in that the locking element is biased against the force of a spring when the locking unit is in the free state. The spring ensures that, whenever the locking unit is not necessarily in its free state, the locking element is automatically moved by the spring into a position in which the locking unit is in its blocking state or at least can be brought into this state. This embodiment of the household appliance or commercial appliance is also configured in such a way that, in the removed state of the support device, the locking element functions regardless of the position in which the support device is held, be it in the usage orientation or also in a reverse orientation in which the support device is rotated by 180° relative to the usage orientation, i.e. it is "upside down".

It is advantageous if the locking element in the installed state of the support device is pressed against the force of the spring into a free state of the locking unit. This ensures that, in the free state of the locking unit, i.e. in the installed state of the support device, the locking element cannot come loose and bring the locking unit into a blocking state. However, for the reasons already described above, it is also advantageous if the locking element is pressed by the spring into a blocking state of the locking unit when the support device is in the removed state. Due to the automatic transfer of the locking unit into the free or blocking state by means of the spring, user intervention is not necessary and locking or unlocking of the rails cannot be forgotten.

A simple construction of a locking unit according to the invention results from the fact that the locking element comprises a rotatably mounted hook. It is then particularly advantageous if the hook is arranged on a first component of the support device and, in order to produce the blocking state, engages around the edge of an opening in a second component of the support device. The hook can be arranged on a first rail and the opening can be arranged on a second rail of a rail system. This results in a compact structure which is not a hindrance when handling the support device. This is achieved all the more when the first rail and the hook are directed towards a nearer side wall of the housing.

It is particularly advantageous if the path of rotation of the hook is limited by a stop in at least one direction of rotation. This can ensure that the spring is neither compressed too much nor relaxed to the extent that it can fall out of the locking unit.

A structurally simple configuration of the locking unit is also achieved in that the actuating arm is moved by an angled portion of a receiving rod of the receptacle and thereby rotates the hook into its free state.

All of the above-described embodiments according to the invention have the advantage in common that the locking units or elements are in each case only located on the support devices, so that structural changes to achieve the advantages according to the invention can be limited to the support device. Thus, even in the case of appliances already delivered to the customer, support devices without a locking device can be replaced by support devices according to the invention.

An embodiment of the invention is shown in the drawings in a purely schematic manner and will be described in more detail below.

DETAILED DESCRIPTION OF THE DRAWINGS

Figure 1:
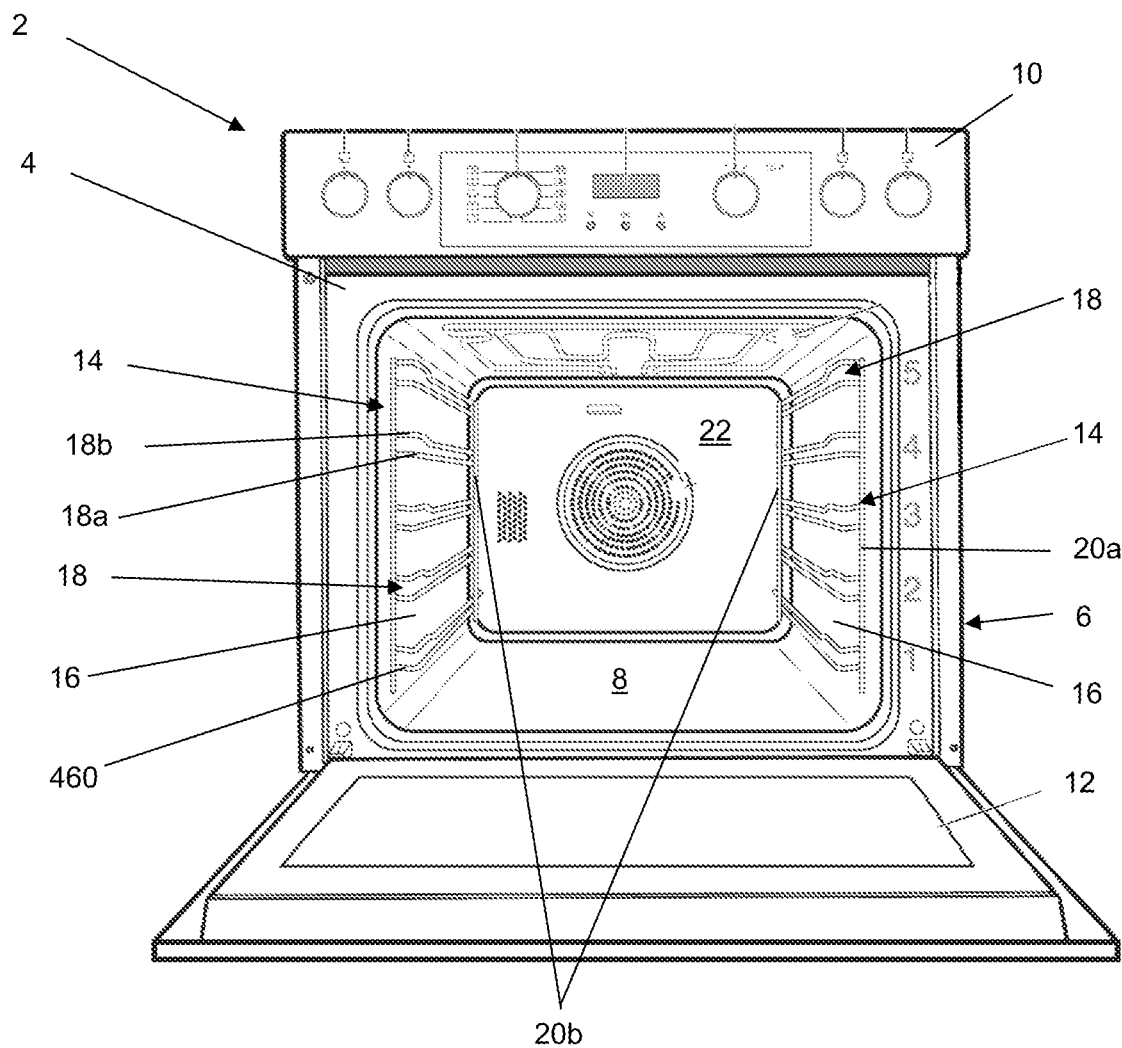
FIG. 1 shows a front view of a household appliance according to the prior art.

All of the embodiments of the invention described below relate to a household appliance 2, which in the present example is designed in the manner of an oven for cooking food. Such a household appliance 2 is shown as an example in FIG. 1. The household appliance 2 has a cuboid housing 6 formed by walls 4, which encloses an interior 8. One wall 4 of the housing, which also forms a front face 10 of the household appliance 2, is provided with a door 12. Furthermore, the household appliance 2 has receptacles 14 for bearing a support device 30 (FIGS. 2 to 4) which are arranged in the interior 8. The receptacles 14 are arranged on two opposite side walls 16 of the housing 6 and are each formed by a plurality of metal rods. Both receptacles 14 are provided with three pairs of rods 18 arranged at a vertical distance from one another, each comprising two horizontally extending receiving rods 18a and 18b. The receiving rod 18a of the pair of rods 18 which is arranged below the other receiving rod 18b of the pair of rods 18, together with a receiving rod 18a on the receptacle 14 of the opposite side wall 16, forms a bearing surface for the support device while the upper receiving rods 18b of the pairs of rods 18 prevent the support device 30 from tipping due to asymmetrical loading. The pairs of rods 18 assigned to a side wall 16 are fixed to two vertically oriented connecting rods 20a and 20b. Here, one connecting rod 20b is arranged in each case on a rear wall 22 of the household appliance 2 remote from the front face 10, while the other connecting rod 22a is arranged in a region of the relevant side wall 16 close to the door 12.

Figure 2:
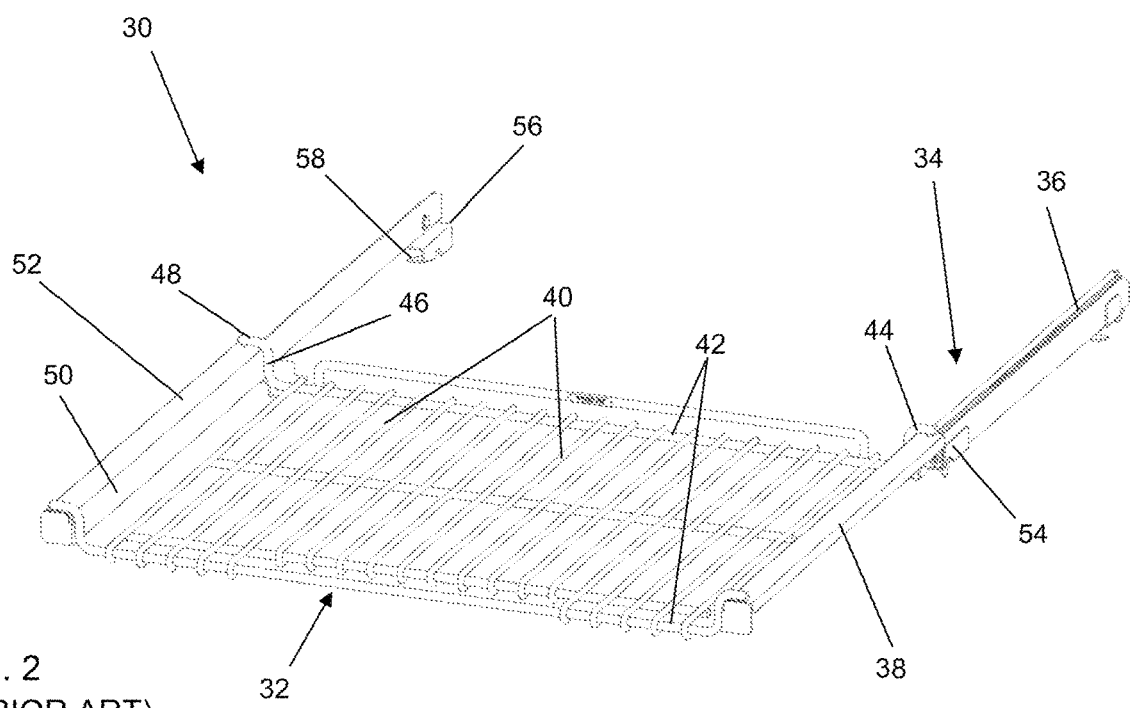
FIG. 2 shows a perspective view of a support device in an installed state with the rail system pulled out.
Figure 3:
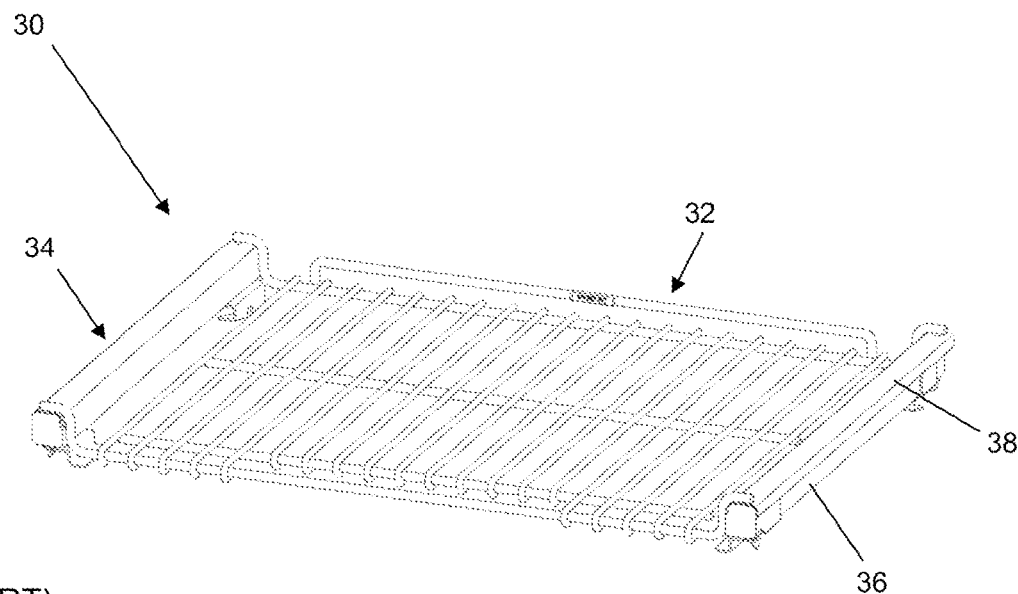
FIG. 3 shows the support device from FIG. 2 with the rail system retracted in a removed state in a usage orientation.
Figure 4:
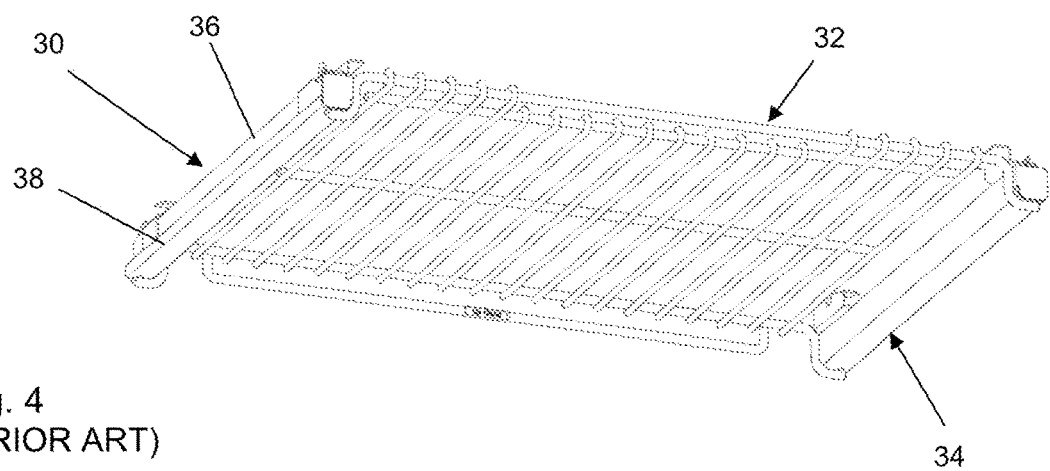
FIG. 4 shows the support device from FIG. 2 with the rail system retracted in a removed state and in a reverse orientation rotated by 180° relative to the usage orientation.
Figure 5:
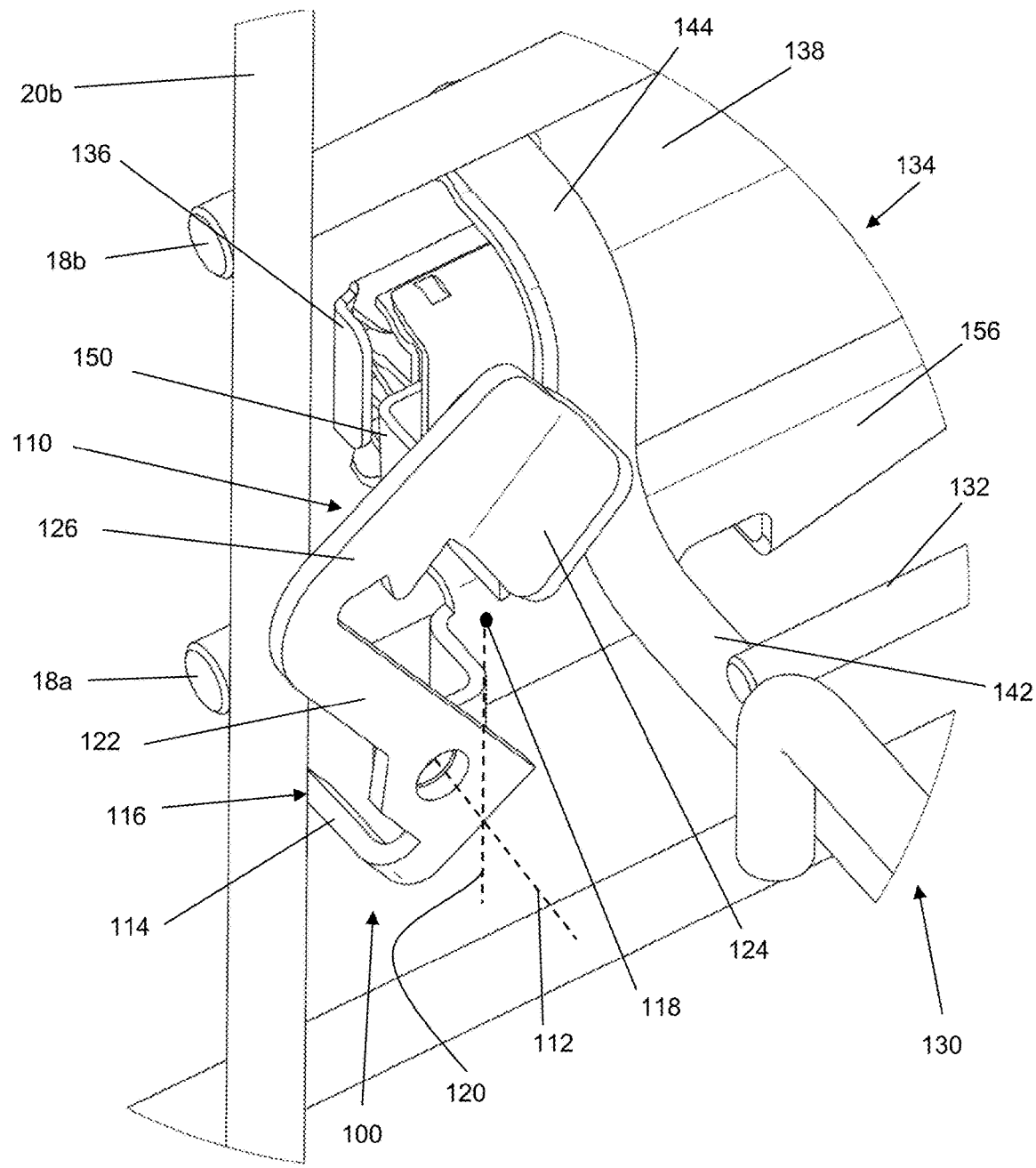
FIG. 5 shows a schematic detail of a first embodiment of a support device equipped with a locking unit, which device rests on a bearing part, the locking unit being in its free state.
Figure 6:
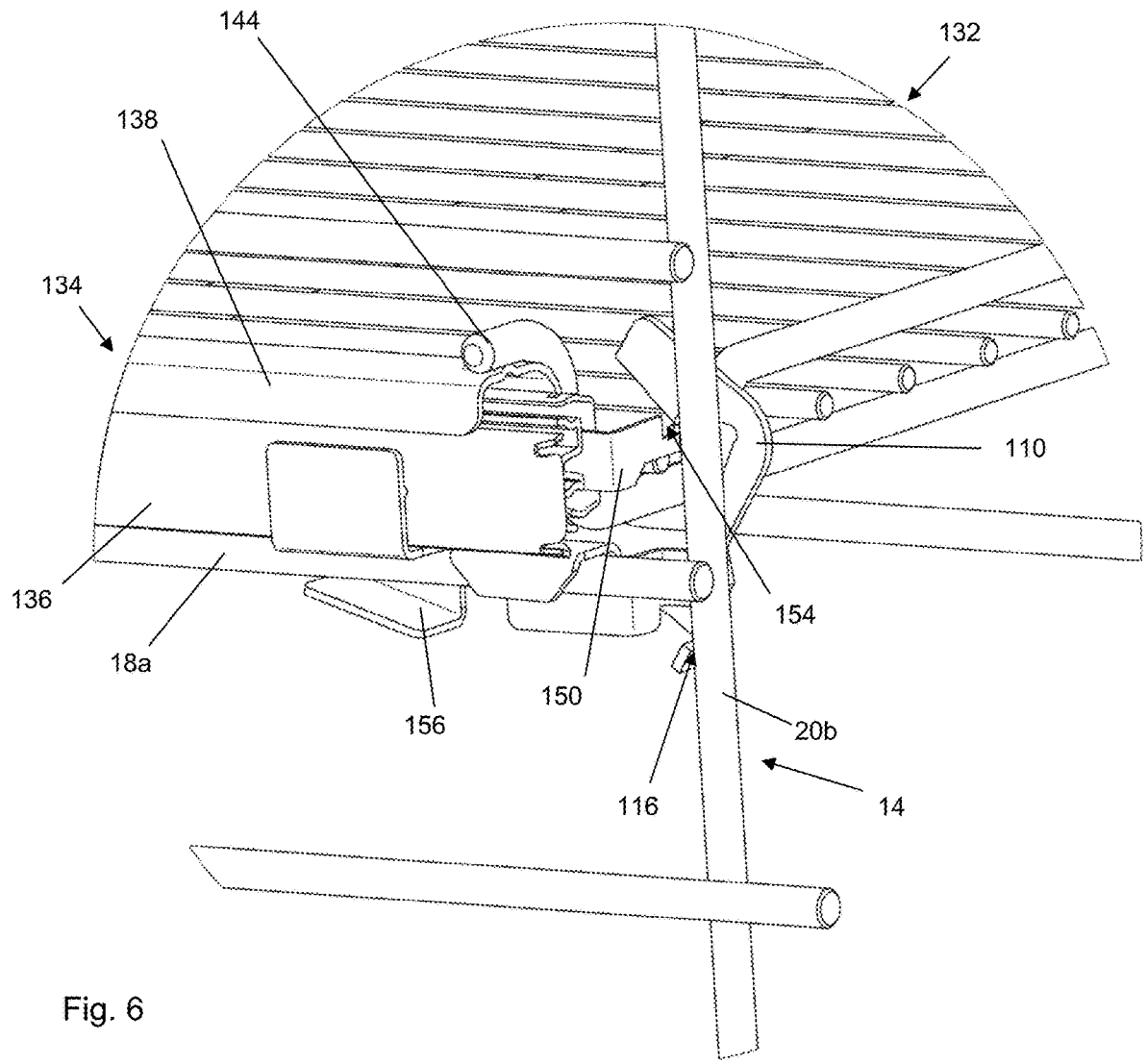
FIG. 6 shows the detail according to FIG. 5, but from a different perspective.

The support device 30, which is initially generally explained for all embodiments with reference to FIGS. 2 to 4, comprises a support element 32 and two rail systems 34. The rail systems 34 each have at least two rails 36, 38 that are movable relative to one another and are formed in the manner of a telescopic extension. A first, lower rail 36 is movably mounted in the second, upper rail 38. It should also be noted that a third rail can be arranged between the lower rails 36 and the upper rails 38 of the rail system 34, which third rail is then movably mounted relative to the other rails 36, 38. These third rails cannot be seen in FIGS. 2 to 4, but they increase the pull-out path of the upper rails 38 together with the support element 32 and it is possible to move the support element completely out of the interior 8. The support element 32 is a rack. The rack consists of a large number of metal bearing rods 40, which form a bearing surface for the food to be cooked (not shown). The bearing rods 40 are fixed to four holding rods 42 arranged transversely to the bearing rods. The support element 32 is fastened by means of two of the holding rods 42 to an upper face of each of the upper rails 38 of the rail systems 34, for example by a welded connection. The ends 44 of the two holding rods 42 are approximately S-shaped, so that a first section 46 of the end 44 runs in parallel with a side surface 50 of the rails 38 and a second section 48 runs in parallel with the upper face 52 of the rails 38.

The two lower rails 36 are each provided with two bearing elements 54 and 56 on a lower face. The bearing elements 54, 56 are arranged at the ends of the two lower rails 36 of the rail systems 34. By means of the bearing elements 54, 56, the rails 36—and thus the support device 30—can be held on the receptacle 14 of the household appliance 2. The support device 30 is placed by means of the bearing elements 54, 56 on the receiving rods 18a of both receptacles 14 or the upper bearing surfaces of said receiving rods 18a, Furthermore, the rear bearing elements 56 facing the rear wall 22 of the household appliance 2 in the installed state of the support device 30 each comprise a securing section 58 which additionally ensures that the support device is held on the receptacle 14 during the removal of the food as a result of the weight force acting on the rack on account of the food during a tilting movement. It should also be mentioned here that in addition to the support device 30 equipped with rail systems 34, the receptacle 14 can also receive other food supports, not shown in the figures, such as griddles or baking sheets without rail systems 34, which then can simply be inserted with their edge between one of the pairs of rods 18 on each side and can be supported by the relevant lower receiving rod 18a.

FIG. 2 shows the support device 30 in a state in which the rail systems 34 are in a pulled-out state, that is, the upper rail 38 with the support element 32 is moved forward relative to the lower ail 36. As a result, food (not shown) located on the support element 32 can be removed particularly easily from the interior 8 of the household appliance 2. For this reason, the support device 30 is mounted indirectly in a force-transmitting manner on the housing 6, namely via the receptacles 14. In particular, this eliminates the need to remove the entire support device 30 if only the cooking state of the food is to be checked or the food is to be placed in the interior 8 of the household appliance 2 or removed from it. FIG. 3 shows, contrary to FIG. 2, the support device 30 in a state in which the rail systems 34 are in an inserted state. According to the invention it should now be ensured that the state shown in FIG. 3. 30 is always present in a removed state of the support device, or at least can be permanently created in order to avoid the user being hindered by the support element 32 or the rails 36, 38 of the rail system 34, which could occur f they were to extend inadvertently due to a change in the orientation of the support device 30 in space—for example when the support device 30 tilts. In contrast, in an installed state of the support device 30 both states shown should be possible. While FIG. 3 shows the support device 30—regardless of whether it is in an installed or removed state—in a usage orientation in which the upper rails 38 are arranged above the lower rails 36, in FIG. 4 the support device 30 in a removed state is rotated by 180° relative to the usage orientation, that is, it is, so to speak, "upside down". Even in this position, with the support device removed, it should not be possible for the user to be hindered by the support element 32 or by the rails 36, 38 of the rail system 34, which could occur if they were to be pulled out unintentionally due to a change in the orientation of the support device 30 in space for example when the support device 30 tilts. The household appliance 2 according to the invention therefore has two similar locking units, each of which is assigned to one of the rail systems.

A first embodiment of such a locking unit 100 is explained in FIGS. 5 to 8 and in the following part of the description, with only one of the locking units 100 being discussed below. In the example shown, the locking unit 100 comprises two locking elements 110 and 150. A first locking element 110, which is rotatably mounted on the support device 130 about an axis of rotation 112, is indirectly assigned to the lower ail 136 of the rail system 134. In this case, the locking element 110 is arranged directly on a bearing element 156 of the support device 130, the support device 130 being placed on a receiving rod 18a of the receptacle 14 or an upper bearing surface thereof by means of the bearing element 156. The lower rail 136 of the rail system 134 is directly coupled to the bearing element 156. The second locking element 150 is arranged on the support device 130 such that it can be rotated about an axis of rotation 152, the locking element 150 being assigned directly to the upper rail 138 of the rail system 134, to which the support element 132 is connected by means of the ends 144 of its holding rods 142.

The locking unit 100 can be transferred between a blocking state and a free state. The blocking state of the locking unit 100 corresponds to blocking positions of the locking elements 110, 150, while the free state of the locking unit 100 corresponds to free positions of the locking elements 110, 150. The free state of the locking unit 100 can be seen particularly well on the basis of FIGS. 5 and 6. It is present when the locking elements 110, 150 are detached from one another so that they do not hinder movement of the two rails 136 and 138 of the rail system 134 relative to one another. In a particularly advantageous manner, the first locking element 110 in the example shown is provided with a cross strut 114, by means of which the locking element 110 can strike a striking point 116 on a vertical strut 20b of the receptacle 14. Here, the locking element 110 protrudes over the support element 132. As a result, the support device 130 can be completely transferred into its installed state by being inserted into the household appliance 2. This does not lead to a collision between the support element 132 and the receptacle 14. Nevertheless, the desired collision of the locking element 110 with the receptacle 14 occurs, so that the latter pivots into its free position automatically, i.e. without manual intervention by the user of the household appliance 2, and releases a positive engagement with the second locking element 150. In this way, as a result of the insertion of the support device 130 into the household appliance 2, it is ensured that the locking unit 100 is automatically transferred into its free state, whereupon the rail system 134 is freed and consequently the two rails 136, 138 can be moved relative to one another.

Conversely, in the course of the transfer of the support device 130 from its installed state into a removed state, in which the support device 130 has been removed from the household appliance and is therefore physically separated from the latter, the locking unit 100 is automatically transferred into its blocking state. During the transfer, it is assumed that the upper rails 138 with the support element 132 are pushed completely onto the lower rails 136. The automatic transfer to the blocking state is based on the fact that a center of gravity 118 of the locking element 110 is located eccentrically with respect to the axis of rotation 112 of the locking element 110 when the locking element 110 is present in its free position. Therefore a line of action 120 of a weight force acting on the locking element 110 due to the dead weight thereof runs under a lever arm 122 with respect to the axis of rotation 112. The weight force therefore causes a restoring moment on the locking element 110, as a result of which the locking element 110 automatically pivots from its free position into a blocking position as soon as the locking element 110 can be freely rotated. The latter is the case when the support device 130 is detached from the receptacle 14 of the household appliance 2 such that the locking element 110 ceases to strike the vertical strut 20b of the receptacle 14. In order for the center of gravity 118 to be arranged on the "correct side" of the axis of rotation 112, the locking element 110 in the example shown has a head weight 124 which is arranged on a hook section 126 of the locking element 110.

The transfer of the locking element 110 into its blocking position means that the locking element 110, which is presented here in the form of a hook, engages, by means of the hook section 126, in a positively engaging manner with the second locking element 150, the hook section 126 moving into a recess 154 in the second locking element 150. A position of the second locking element 150 does not initially change. The positive engagement of the two locking elements 110, 150 corresponds to the blocking state of the locking unit 100, the presence of which means the two rails 136, 138 of the rail system 134 cannot be moved relative to one another. As a result, the rail system 6 is prevented from being pulled out inadvertently. The securing of the rail system 134 against this pulling-out takes place automatically, i.e. without manual intervention by the user of the household appliance 2. This ensures a particularly high level of security against incorrect operation.

Figure 7:
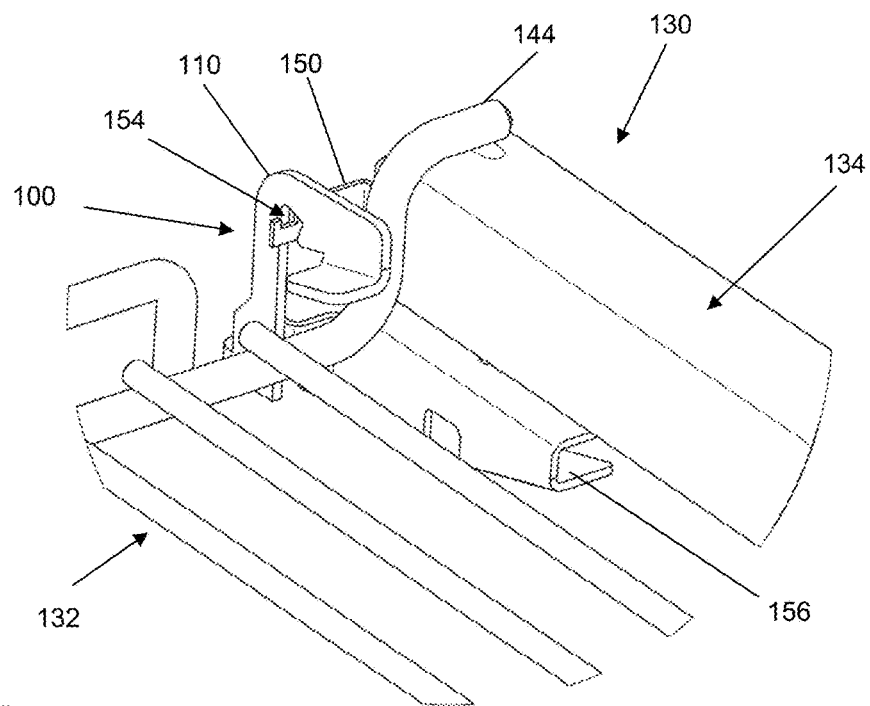
FIG. 7 shows the detail according to FIG. 6, in which locking elements of the locking unit are each in a first blocking position.
Figure 8:
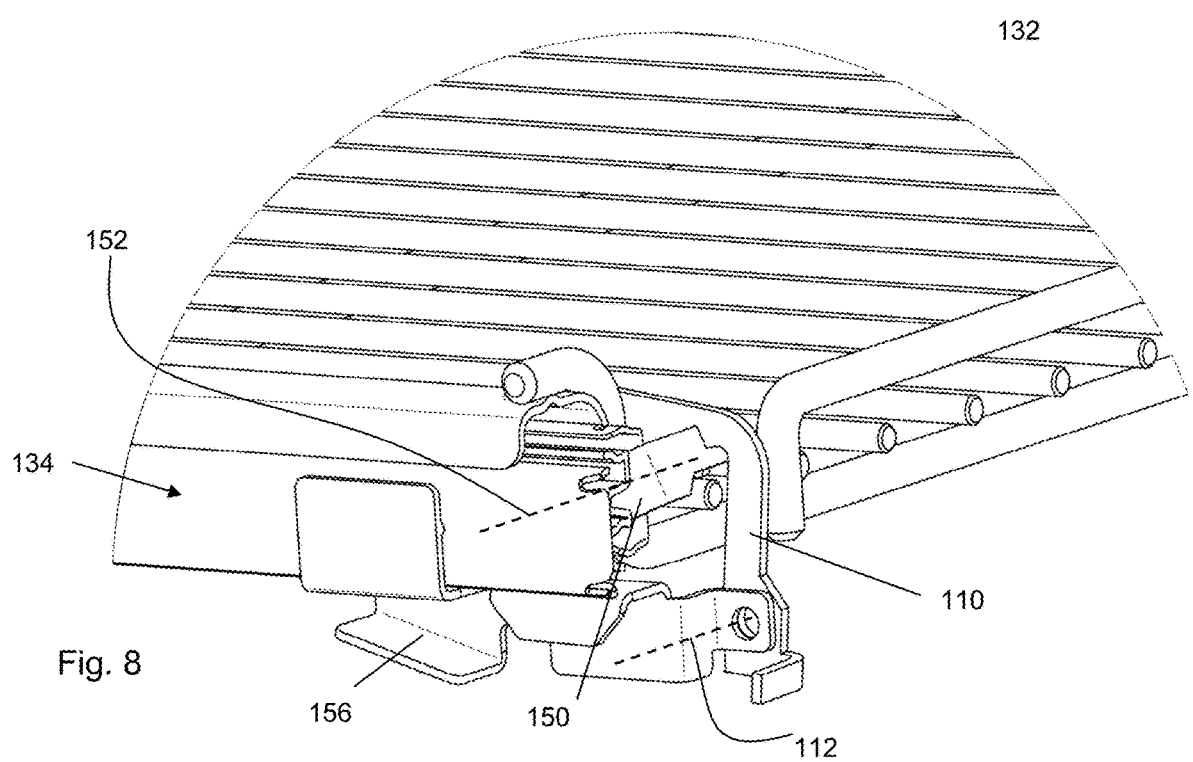
FIG. 8 shows the detail according to FIG. 7, in which the locking elements are each in a second blocking position.

The blocking state of the locking unit 100 can be seen particularly well from FIGS. 7 and 8. It is worth mentioning here that the blocking state of the locking unit 100 can be in different blocking positions when the locking elements 110, 150 are present. A first scenario has already been described above. Here, the support device 130 is removed from the household appliance 2, starting from its installed state, the support device 130 being pulled out of the interior 8 along the lower receiving rod 18a of the receptacle 14. Here, the locking element 110 no longer strikes the rear vertical strut 20b and, due to the dead weight thereof, is automatically rotated into its blocking position and brought into engagement with the second locking element 150. The two locking elements 110, 150 are then each in a first blocking position. This is shown in FIG. 7. The support device 130 is in a usage orientation. If this usage orientation is present, the support element 132 is oriented at least substantially horizontally in space, so that an item can be stored on a placement plane of the support element 132, specifically in the position shown in FIG. 3. In the example shown, the support element 132 designed as a rack is therefore suitable for receiving a particular item to be cooked. The support element 132 is therefore intended to receive an item.

If the support device 130 is in its removed state, in which it is physically separated from the housing 6 of the household appliance 2, it is nevertheless possible to transfer the support device 130 into another orientation, for example into a reverse orientation, as shown in FIG. 4. This can be provided in particular for cleaning purposes. In this reverse orientation, the support device 130 is rotated by 180° relative to the usage orientation, so that it is, as it were, inverted or oriented "upside down". According to the invention, the rail system 134 is secured against inadvertent pulling-out even with this orientation of the support device 130 and remains so if the support device 130 is subsequently tilted into a different orientation. For this purpose, in the embodiment shown, the second locking element 150 can be rotated about the axis of rotation 152 relative to the support device 130. This offers the advantage that the second locking element 150 can move as a result of the changing orientation of the weight force acting on it, as a result of which the positive engagement with the first locking element 110 is maintained even when it rotates due to gravity. This can be seen particularly well with reference to FIG. 8, which shows the second locking element 150 in a blocking position pivoted "upwards" in the drawing. In fact, the locking element 150 is always pivoted "downwards" in the reverse orientation of the support device 130, i.e. in each case following a direction of action of the force of gravity. The view in FIG. 8 shows the support device 130 to some extent the wrong way around. The rotatability of the second locking element 150 means that the latter, with its recess 154, maintains the positive engagement with the first locking element 110, so that, as a result, the rail system 134 is blocked in space against inadvertent pulling-out, regardless of the orientation of the support device 130. The locking unit 100 is therefore in its blocking state, as desired, regardless of the orientation of the support device 130.

Figure 10:
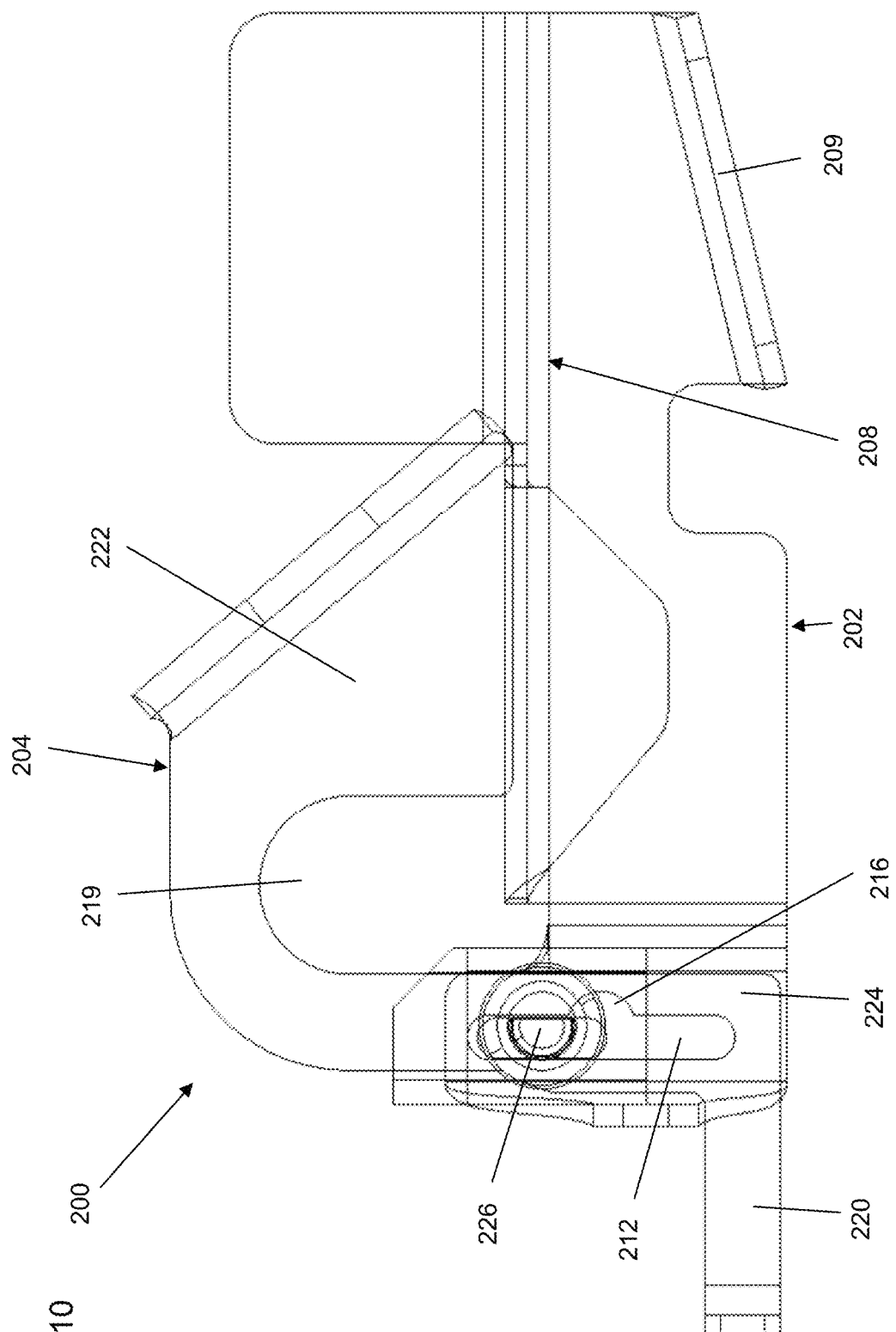
FIG. 10 shows a view as in FIG. 9, in which the locking element is in a second fixed position.
Figure 11:
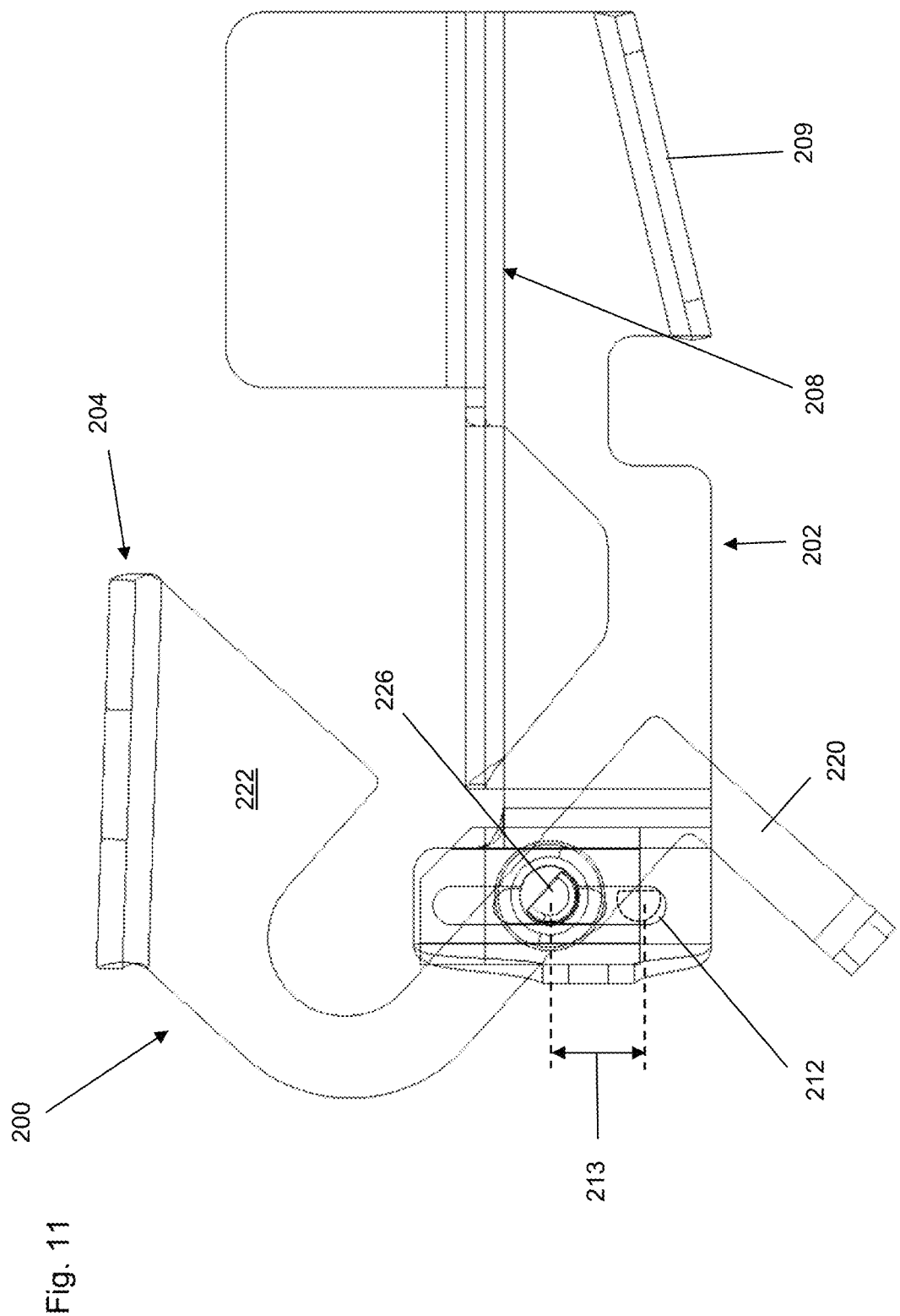
FIG. 11 shows the locking unit with the locking element in the rotational position.
Figure 12:
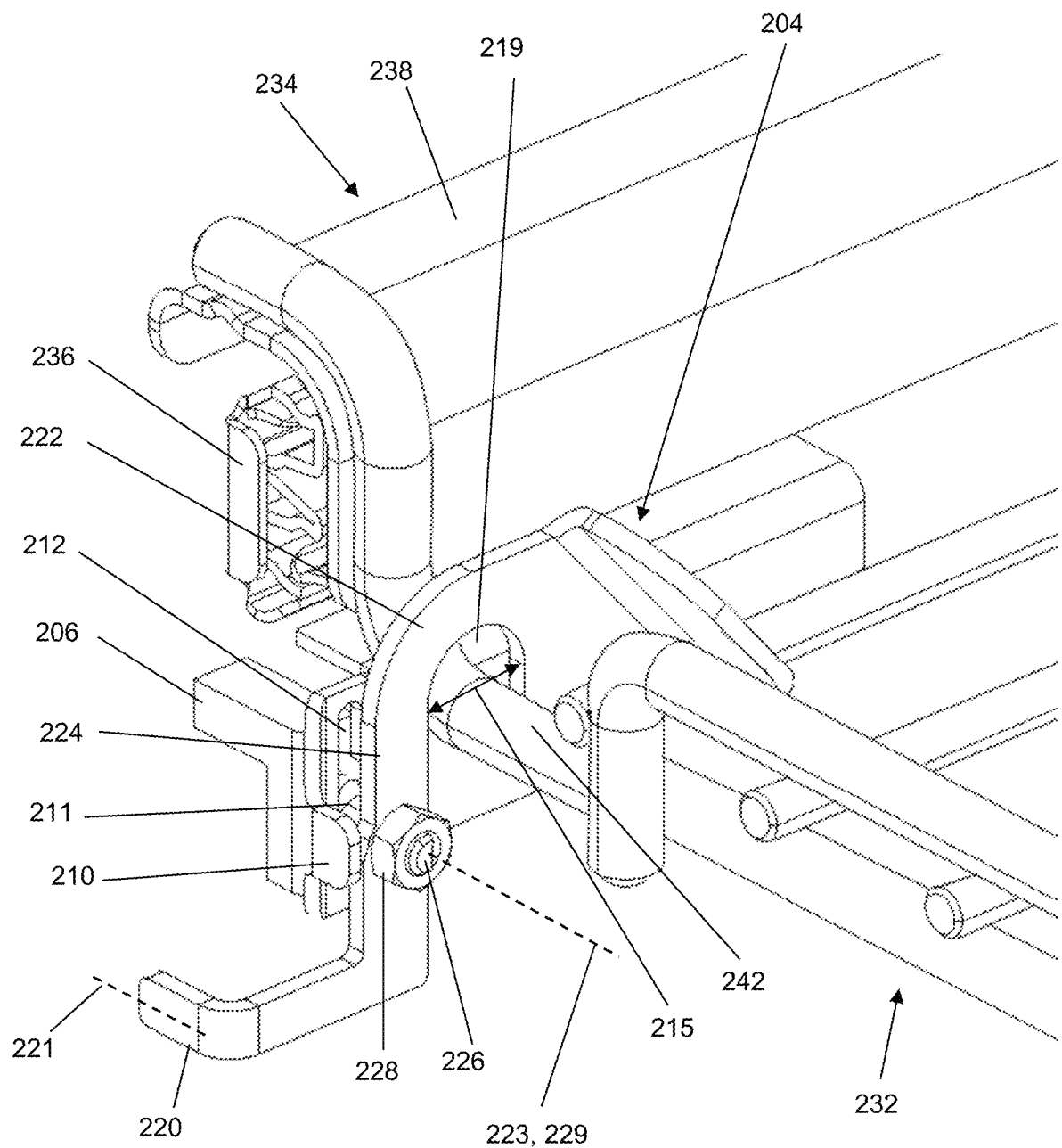
FIG. 12 shows a perspective view of the second embodiment of a support device according to the invention and its locking unit.
Figure 13:
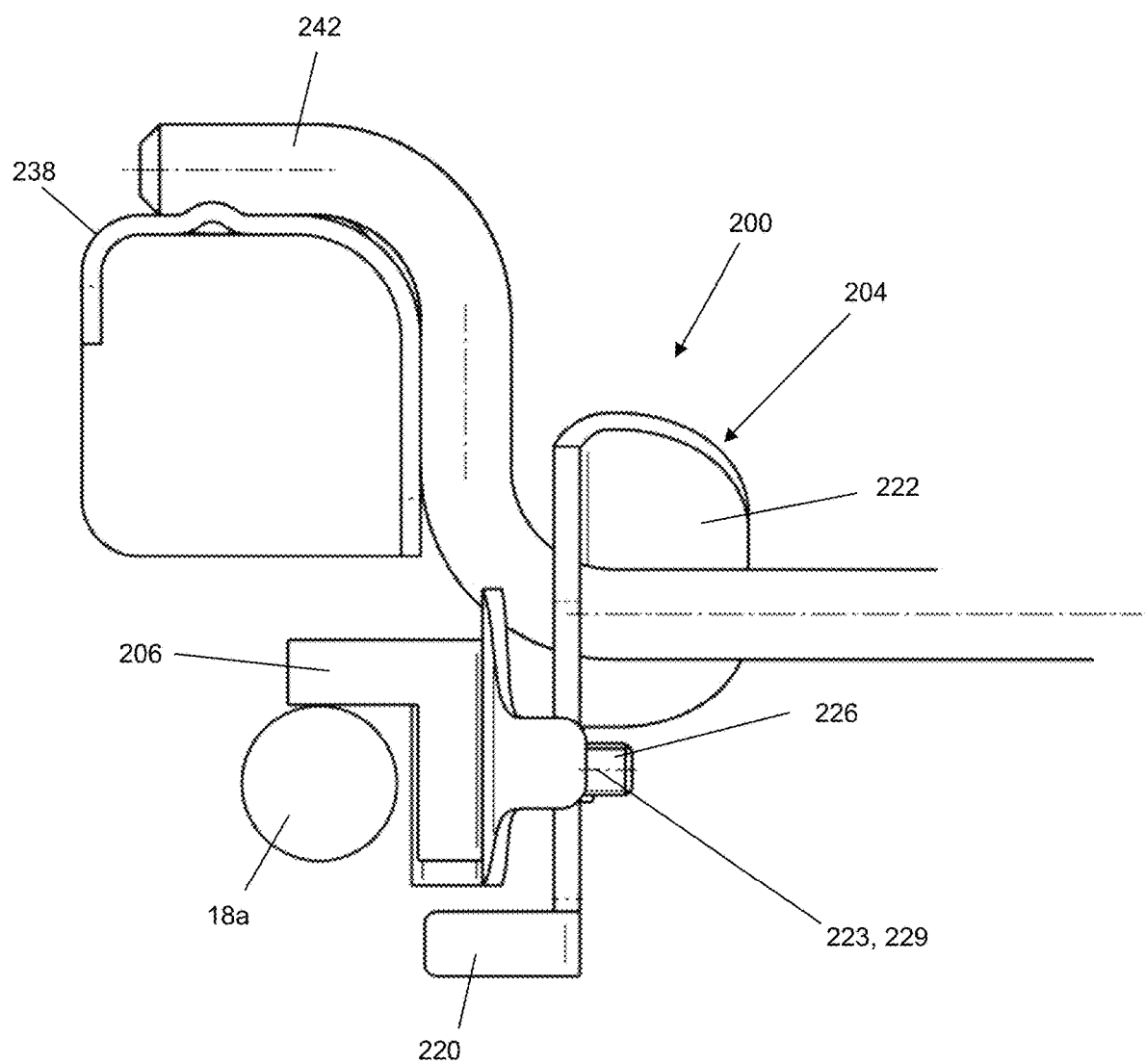
FIG. 13 shows a vertical section through the second embodiment of a support device according to the invention and its locking unit.

A second embodiment of a locking unit 200 is shown in FIGS. 9 to 13 and described below. The locking unit 200 comprises a placement section 202, a locking element 204 and a guide device 206, which is shown in FIGS. 12 and 13, and is arranged on a lower rail 236 of the support device 230.

The support device 230 can be placed on the receptacle 14 of the household appliance 2 by means of the placement section 202 and can thus be transferred into its installed state. For this purpose, the placement section 202 has a placement surface 208 which, in the installed state of the support device 230, is in contact with the bearing surface of the lower receiving rod 18a of the receptacle 14. A holding element 209 arranged laterally on the locking unit 200 prevents the support device 230 from tipping as a result of asymmetrical loading of a support element 232 of the support device 230.

Furthermore, the locking unit 200 is provided with an elongate hole 212 which is oriented perpendicularly with respect to the plane which forms the support element 232. When the support device 230 is in its installed state, the elongate hole 212 is oriented vertically. Along a longitudinal axis 214, the elongate hole 212 has a semicircular widening 216 on one side, which is arranged in a central region of the elongate hole 212. The widening 216 thus has an effective region in which a width 218 of the elongate hole 212 is greater than outside the effective region.

The locking element 204 comprises a striking section 220, a hook section 222 and a connecting section 224. The connecting section 224 has a web-like configuration and is provided with a circular opening 225 in a central region. A partial bolt 226, the cross section of which is formed by a semicircular surface, is guided through the opening 225. The diameter 227 of the partial bolt 226 corresponds approximately to the diameter 217 of the widening 216 of the elongate hole 212. As shown in FIG. 12, the partial bolt 226 is anchored immovably on the locking element 204 by means of a nut 228. The striking section 220 of the locking element 204, which is arranged at one end of the connecting section 224, is L-shaped and is bent at its free end by 90° with respect to a longitudinal axis 229 of the partial bolt 226, which axis also forms an axis of rotation 223, so that a longitudinal axis 221 of the striking section 220 runs in parallel with the axis of rotation 223 of the partial bolt 226. The hook section 222 is arranged at the other end of the connecting section 224 and has a U-shaped recess 219. An opening cross section 215 of the recess 219 is larger than the diameter of a holding rod 242 of the support element 232. Furthermore, the locking unit 200, as shown in FIG. 12, has a guide device 206. The guide device 206 is L-shaped and has a circular opening (not visible in the figure). Starting from the locking element 204, the partial bolt 226 is guided through the elongate hole 212 of the locking unit 200 and the opening of the guide device 206, an additional spacing element 211 in the form of a ring being arranged between the elongate hole 212 and the locking element 204. The end of the partial bolt 226 remote from the locking element 204 is rotatably mounted in the opening of the guide device 206. The partial bolt 226 is slidably mounted along the elongate hole 212. In this case, the locking element 204 is connected in a force-transmitting manner to the guide device 206 such that a movement of the guide device 206 along the elongate hole 212 is transmitted to the locking element 204.

Figure 9:
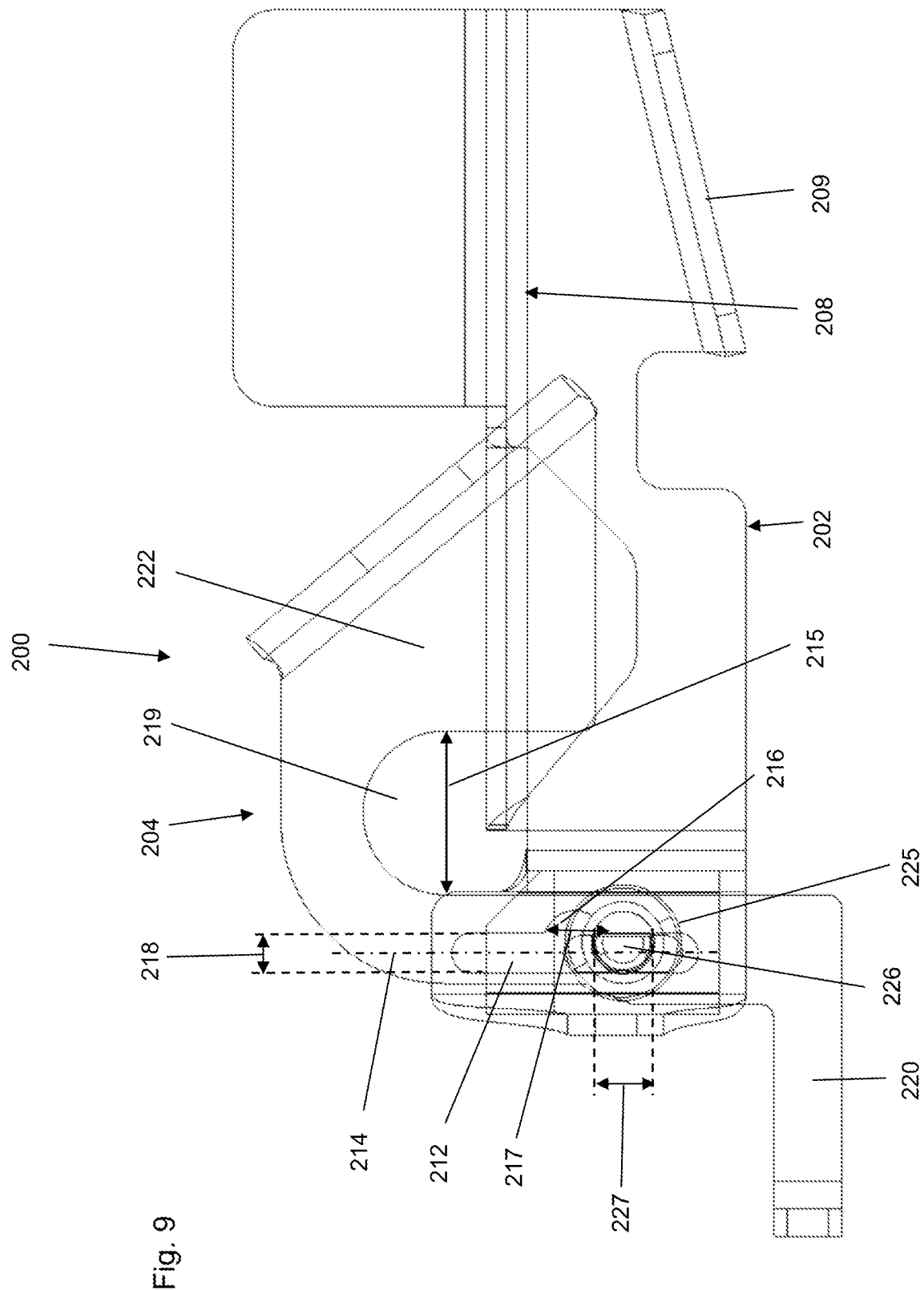
FIG. 9 shows a side view of a second embodiment of a locking unit according to the invention with a locking element in a first fixed position.

The locking element 204 can thus be transferred between a plurality of fixed positions and a rotational position. In the fixed positions, which are shown in FIGS. 9, 10 and 12, rotation of the locking element 204 is at least substantially prevented. If the partial bolt 226 is outside the effective region of the widening 216, free rotation of the locking element 204 is prevented by the partial bolt 226 being rotatable only until it strikes the elongate hole 212. This is brought about by the fact that the diameter 227 of the partial bolt 226 is larger than the width 218 of the elongate hole 212.

In contrast, in a rotational position of the locking element 204, which is shown in FIG. 11, the locking element 204 can be rotated. The locking element 204 assumes the rotational position when the partial bolt 226 is in the effective region of the widening 216. The effective region is dimensioned such that the partial bolt 226 can be freely rotated in the effective region. The rotatability is only limited by the fact that the locking unit 200 has a striking section 201 which is arranged in parallel with the axis of rotation 223 of the partial bolt 226. Here, in the course of its rotation the locking element 204 strikes the striking section 210 shown in FIG. 12 and thus prevents the locking element 204 from rotating beyond this point.

In the removed state, the locking element 204 is moved into a maximum position in the elongate hole 212 as a result of the force of gravity acting on it. The partial bolt 226 assumes a first maximum position (shown in FIG. 9 and FIG. 12), if the support device 230 is in a usage orientation (shown in FIG. 3). The usage orientation is characterized in that the support device 230 is usually used in this orientation for cooking the food. The second maximum position (shown in FIG. 10) is assumed by the partial bolt 226 when the support device 230 is in a reverse orientation (shown in FIG. 4) in which the support device 230 is rotated by 180° about a horizontal relative to the usage orientation. In the maximum positions, the locking element 204 is in a fixed position in which rotation of the locking element 204 is blocked. The locking element 204 is thus in its blocking position. Here, the hook section 222 of the locking element 204, as shown in FIG. 12, engages by positively engaging around the holding rod 242 of the support element 232, and thus prevents the upper rails 238 and the support element 232 attached thereto from being pulled out relative to the lower rails 236 of the rail systems 234.

When the support device 230 is transferred from its removed state to an installed state, the support device 230 is placed on the lower receiving rods 18a of the receptacles 14 by means of the placement section 202 of the locking unit 200. Here, the guide device 206 is moved along the longitudinal axis 214 of the elongate hole 212 in such a way that an underside thereof facing the lower receiving rod 18a is oriented in parallel with the placement surface 208 of the placement section 202. As a result of the force-fitting coupling of the guide device 206 to the locking element 204, the locking element is also moved along the elongate hole 212. Here, the path that the locking element 204 travels along the longitudinal axis 214 of the elongate hole 212 corresponds exactly to the distance 421 between the first maximum position of the locking element 204 and the position in which the partial bolt 226 is arranged in the effective region of the widening 216. The partial bolt 226 is thus automatically moved into the effective region of the widening 216 in the course of the transfer of the support device 230 into its installed state. Furthermore, the striking section 220 strikes the rear vertical connecting rod 20b when the support device 230 is transferred into its installed state. As a result, the locking element 204 is rotated about the axis of rotation of the partial bolt 226, so that the locking element 204 is transferred into its free position. As a result, the hook section 222 releases the holding rod 242, so that an extension of the rail systems 234 is allowed. The locking unit 200 is now in its free state. The support device 230 can therefore be pulled out relative to the housing 6 of the household appliance 2.

Figure 14:
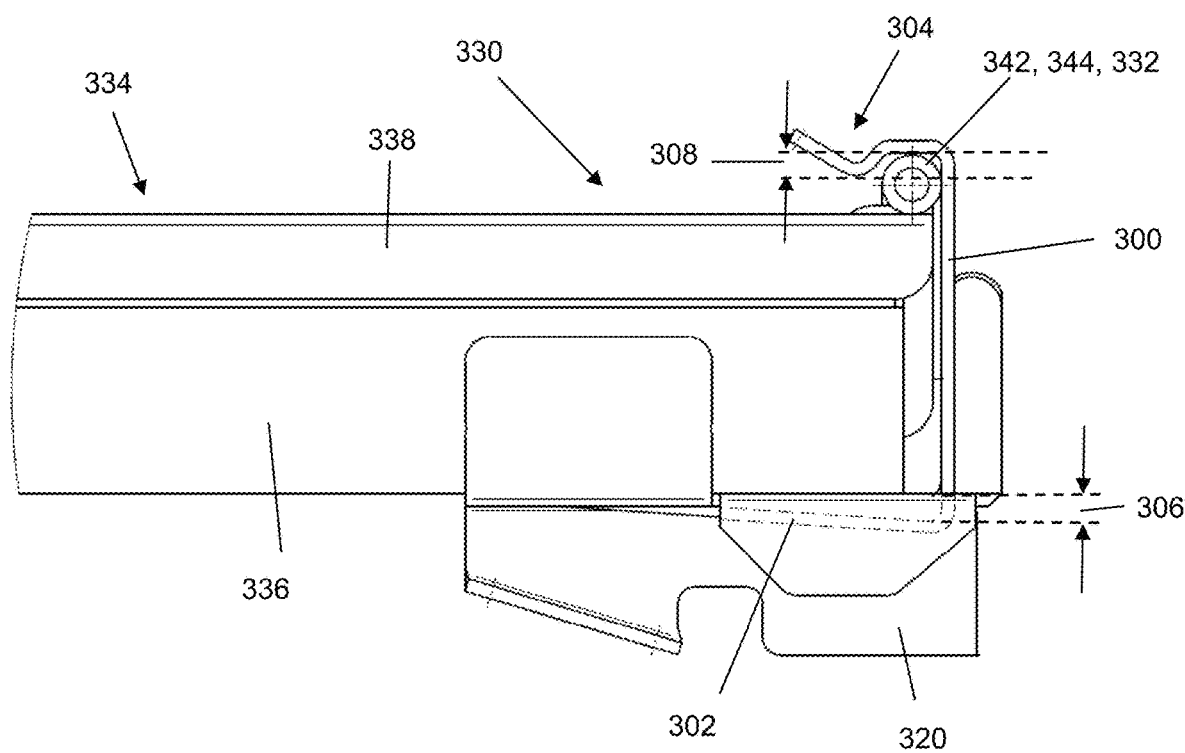
FIG. 14 shows a vertical section through a third embodiment of a support device and its locking element according to the invention.

A support device 330 according to a third embodiment of the invention is provided with two locking elements 300, which are each arranged on the lower rails 336 of the two rail systems 334. In the description of this embodiment of the invention, locking units are formed by the locking elements 300 themselves and are identical to them. FIG. 14 shows a vertical section through a locking element 300 and through the support device 330. The locking element 300 is a spring element. The locking element 300 has a fastening section 302 and a holding section 304. The fastening section 302 serves to fasten the locking element 300 to the lower rail 336 of the rail system 334. Here, a free end of the fastening section 302 is rigidly connected to the rail 336, for example by welding. The holding section 304 enables a positive engagement to be formed with the support device 330, in particular an end 344 of a holding rod 342 of the support element 332, which, as described above, is connected to the upper rail, preferably by welding. A cross section of the holding section 304 is approximately S-shaped and thus enables a positive engagement around the holding rod 342. In a blocking state, as shown in FIG. 14, the locking element 300 blocks the pulling-out of the rail system 334 by forming a positive engagement with the end 344 of the holding rod 342, and, as a result of the connection of the locking element 300 to the lower ail 336 and the support element 332 to the upper rail 338, the two rails 336 and 338 are coupled together. The state of the support device 330 shown in FIG. 14 corresponds to its removed state.

Figure 15:
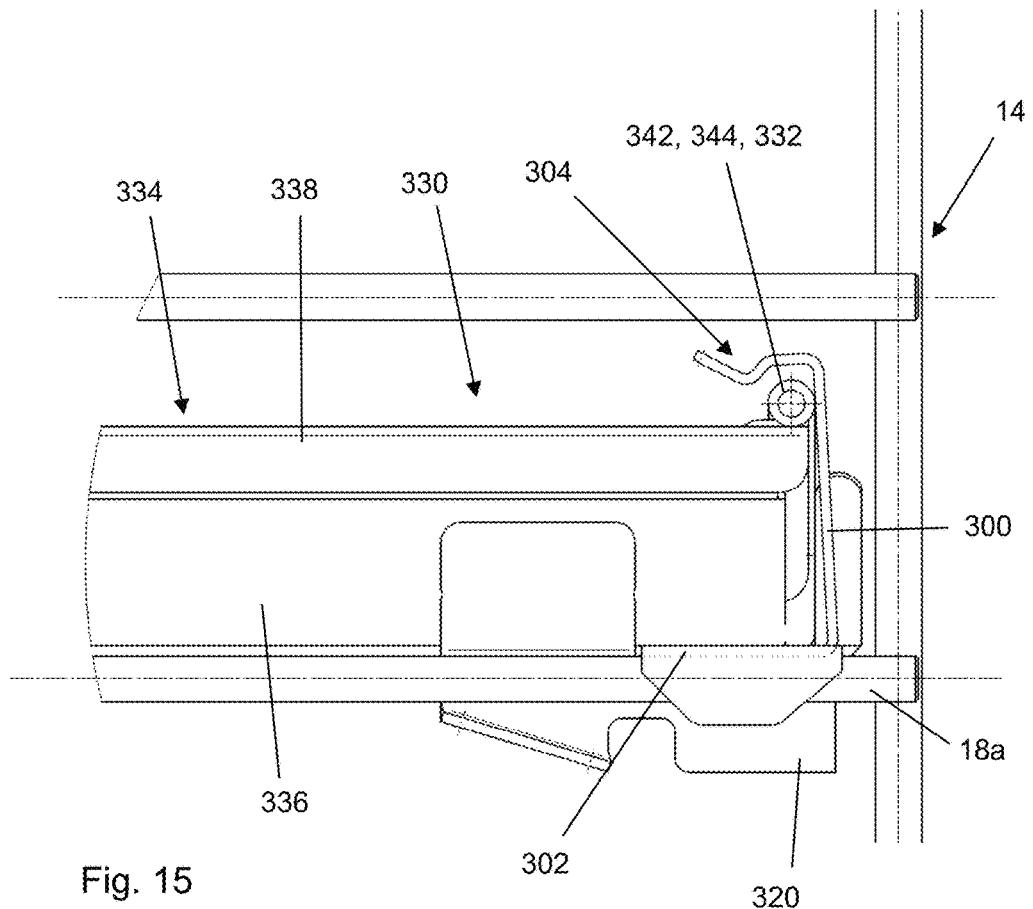
FIG. 15 shows a vertical section according to FIG. 14, in which the support device is in an installed state.

In an installed state, however, in which the support device 330 is arranged in the household appliance 2 and in this case rests with its bearing elements 320 on the lower receiving rod 18a of the receptacle 14, the weight force caused by the dead weight of the support device 330 causes the locking element 300 to be deformed such that the holding section 304 of the locking element 300 releases the holding rod 342 of the support element 332. FIG. 15 shows a vertical section through the support device 330 and the locking element 300 in an installed state of the support device 330 and the resulting free state of the locking unit 300. In particular, the fastening section 302 is deformed in such a way that it runs in parallel with the lower receiving rod 18a of the receptacle 14 and rests completely on the latter. As a result, the holding section 304 is moved counter to the acting weight force in that the support device 330 is, so to speak, placed onto the fastening section 302. The path of the deflection is adapted to a diameter of the end 344 of the holding rod 342, so that the holding rod 342 of the support element 332 can be guided through the resulting gap when the rail system 334 is pulled out. In other words, a maximum deformation path 306 of the locking element 300 exceeds its engagement depth 308 on the holding rod 342.

If the support device 330 is removed from the household appliance 2 after use, the locking element 300 is automatically transferred from its free state to its blocking state as a result of the receptacle 14 no longer being struck and due to a restoring force stored in the locking element 300 as a result of the elastic deformation. It is therefore initially impossible to pull out the rail system 334. This applies both to a usage orientation of the support device 330 and to a reverse orientation rotated by 180°.

FIGS. 16 to 19 show a fourth embodiment of a support device 430 according to the invention. In contrast with the previously described embodiments, the locking units 400 are not arranged here in the rear region but in the front region of the rail systems 434, see FIGS. 16 and 17. Here too, when the support device 430 is inserted into the receptacle 14, i.e. when the support device 430 is transferred into its installed state, the locking elements 402 of the locking units 400 are automatically transferred into their free state without further action by the user. In the following, reference is only made to one rail system 434 and one locking unit 400, nevertheless locking units 434 are provided on both rail systems 434, It should also be mentioned that in FIGS. 18 and 19 the support element 402 has been omitted and only one rail system 434 is shown.

Figure 16:
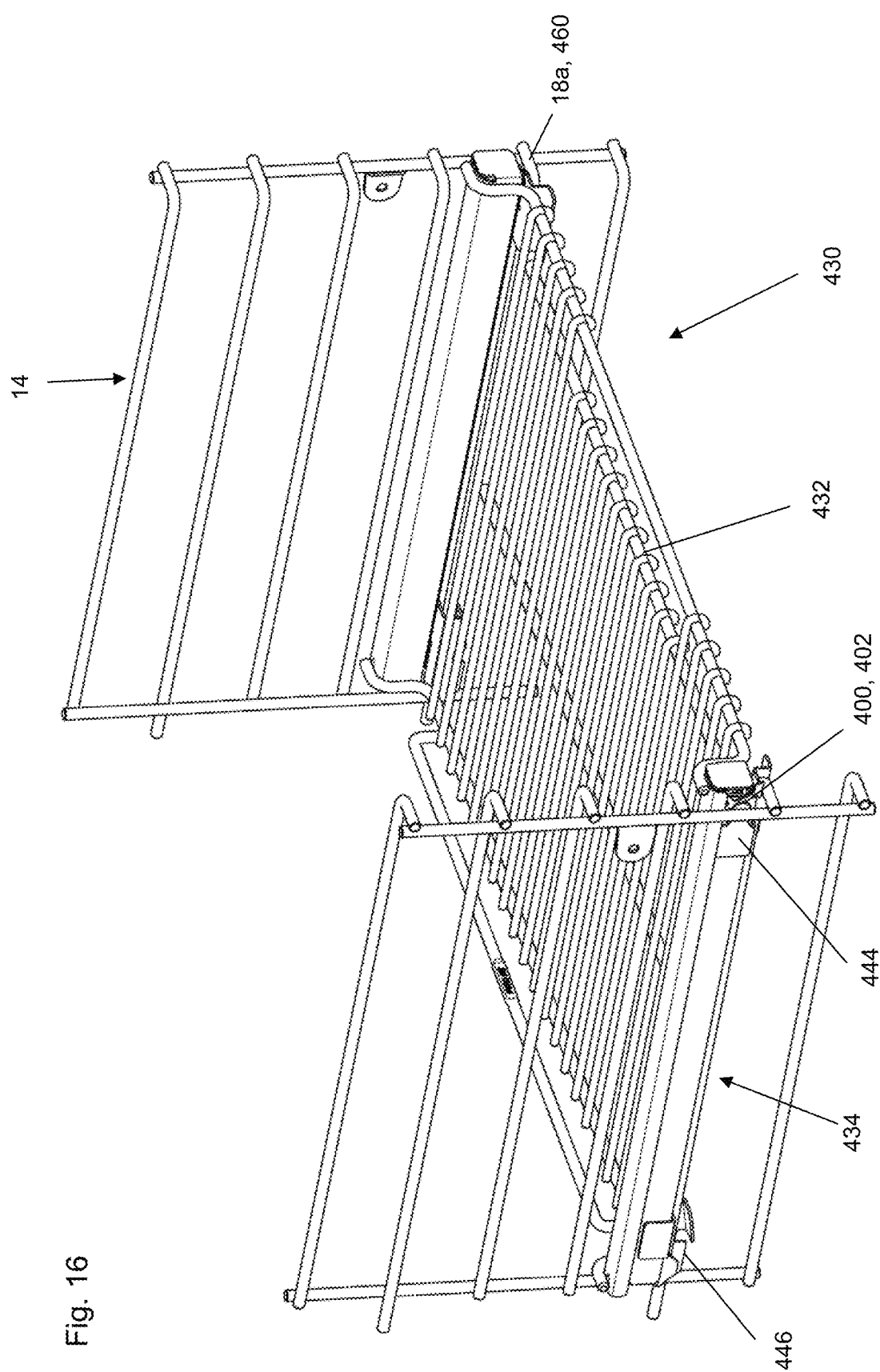
FIG. 16 shows a fourth embodiment of a support device in a receptacle.
Figure 17:
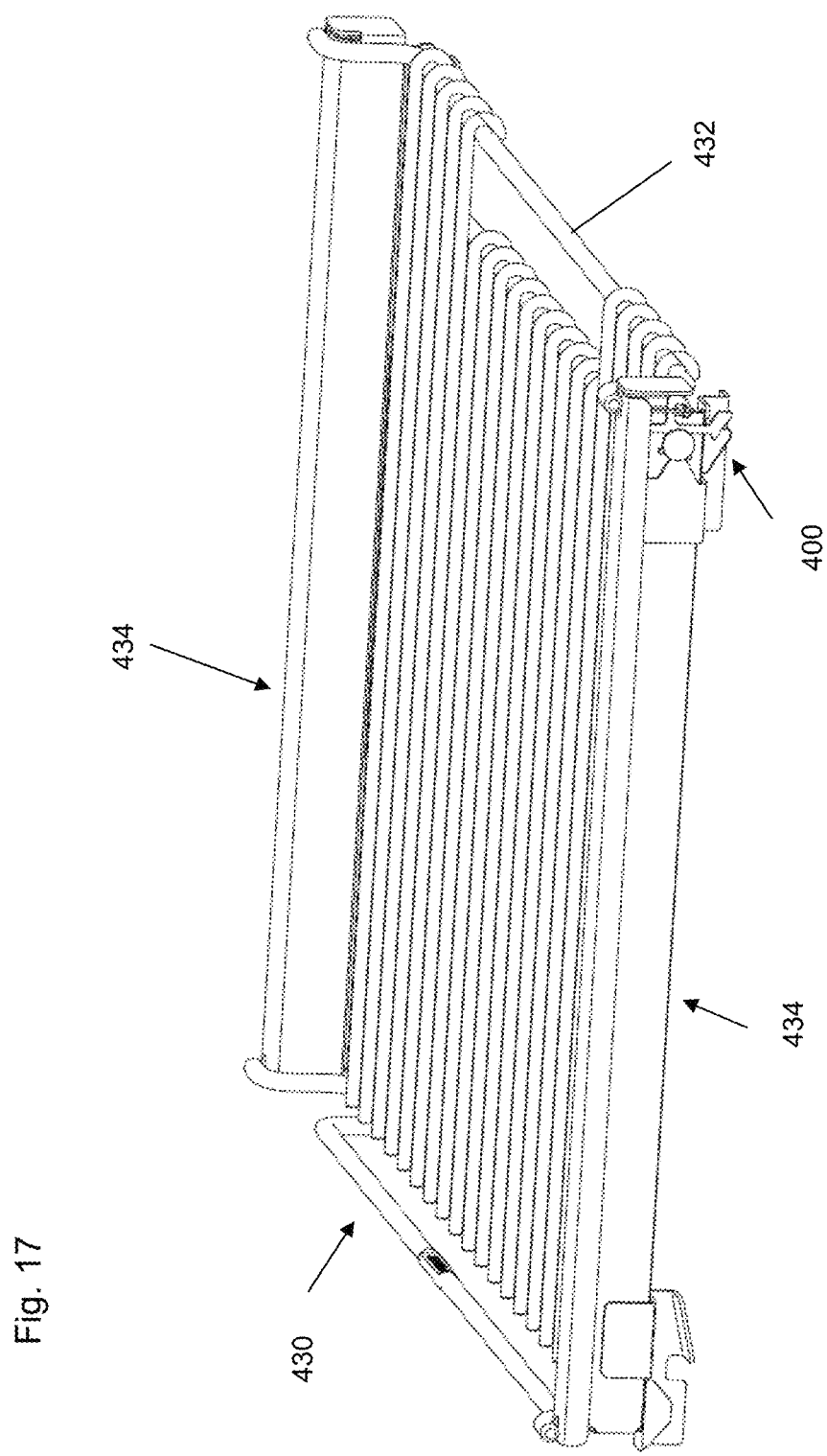
FIG. 17 shows the support device according to FIG. 16 in the removed state.
Figure 18:
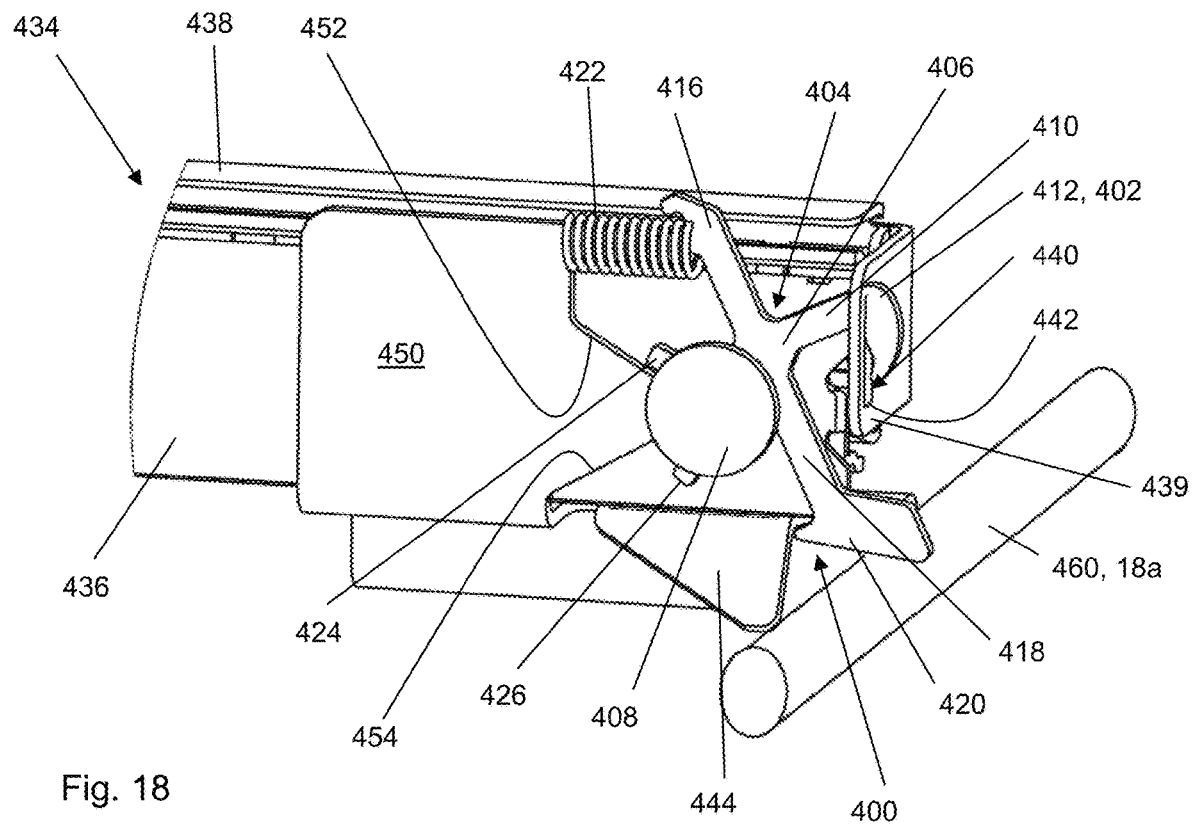
FIG. 18 shows the rail system of the support device according to FIG. 16 with a locking unit according to the invention in its free state and FIG. 19 shows the rail system of the support device according to FIG. 16 with a locking unit according to the invention in its blocking state.
Figure 19:
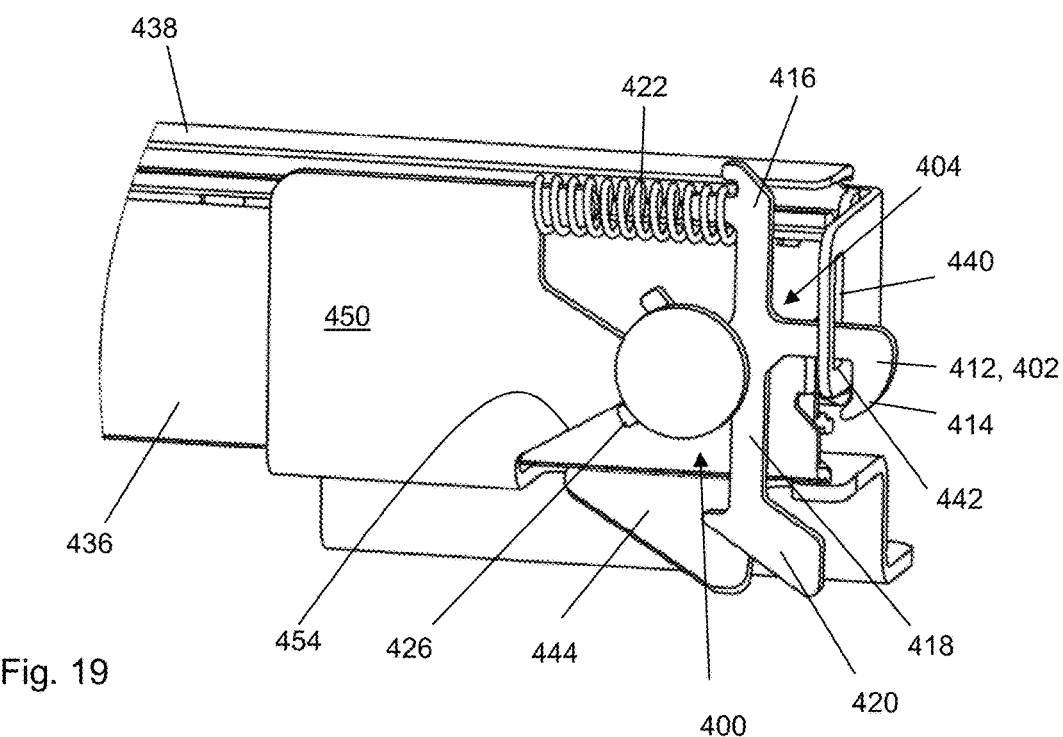

As can be seen in particular from FIGS. 17 and 18, a rotary element 404 is rotatably mounted on the lower rail 436 of a rail system 434. Starting from a central mounting region 406, the rotary element 404 comprises a hook arm 410, a spring arm 416 and an actuating arm 418. The mounting region 406 has an opening which cannot be seen in the figures because a mounting pin 408 is inserted through it and is fastened to the lower rail 436. In FIGS. 17 to 19, two stops 424 and 426 integrally formed on the rotary element 404 extend from the mounting region 406 to the left. The upwardly directed spring arm 416, together with a holding element 450, which is also fastened to the lower rail 436, clamps a coil spring 422 and compresses it to a greater or lesser extent depending on the rotational position of the rotary element 404. The actuating arm 418 extends downward in FIGS. 17 to 19 and thus in the usage orientation of the support device 430. It has an integrally formed contact region 420 which, in the installed state of the support device 430 shown in FIGS. 16 and 18, abuts an angled portion 460 of the lower receiving rod 18a. It can be seen from FIG. 1 that this angled portion 460 of the lower receiving rod 18a is located in the front region of the relevant side wall 16 close to the door 12 and is welded to the front vertical connecting rod 20a. The hook arm 410, which extends to the right in FIGS. 17 to 19, has a hook 412, the actual locking element 402, at its end remote from the mounting region 406. This is constructed and placed so that it can reach through a slot-shaped opening 440, which is located in an angled end 439 of the upper rail 438, regardless of the rotational position of the rotary element 404. The entire locking unit 400 is in each case arranged on the side of the rail system 434 which faces the nearer side wall 16 of the housing 2. It is thus located between the respective rails 436 or 438 and the relevant receptacle 14 in the installed state of the support device 430, and is therefore not visible to the user.

In order to bring the support device 430 into the installed state shown in FIGS. 16 and 18, it is pushed, as in the three embodiments described above, with its bearing elements 444 and 446 onto the lower receiving rods 18*a*. At the end of this insertion movement, the contact region 420 of the actuating arm 418 comes into contact with the angled portion 460 of the receiving rod 18*a* and the entire rotary element 404 is moved from the positions shown in FIGS. 17 and 19 by approximately 30° counterclockwise into the position shown in FIG. 18 until the upper stop 424 presses against the upper slope 452 of the holding element 450 and the rotational movement is stopped thereby. In this position, as can be seen in FIG. 18, the hook arm 410 is rotated upwards and the hook 412 is no longer in engagement with the edge 442 of the opening 440. The locking unit 400 is thus in its free state. With the rotation of the rotary element 404 counterclockwise, the spring arm 416 is also rotated in this direction. Thus in the course of the rotation it compresses the coil spring 422 against the holding element 450. The entire rotary element 404 and thus in particular the locking element 402 is thereby biased against the force of the spring 422 and pressed into a free state of the locking unit 400. The two rails 436 and 438 can be moved against one another and the support element 432 can be pulled out of the interior 8 together with the upper rails 438, for example for loading and unloading or for checking the food to be cooked during the cooking process.

When the entire support device 430 is removed from the appliance 2, it is pulled out of the appliance 2 on the lower receiving rods 18*a*. The lower rail 436 and thus also the locking unit 400 with its actuating arm 418 moves away from the angled portion 460 of the receiving rod 18*a*. The contact region 420 on the actuating arm 418 is then no longer in contact with the receiving rod 18*a*, which is why the coil spring 422 presses the rotary element 404 back into its position shown in FIGS. 17 and 19. If, in this removed state of the support device 430, the support element 432 with the upper rails 438 has already been pushed to the end on the lower rails 436, as shown in FIG. 17, the hook 412 engages around the edge 442 of the opening 440 and provides a positive engagement between the upper rail 438 and lower rail 436. The blocking state of the locking element 402 is then automatically produced. If, on the other hand, the lower rail 436 is pulled out a little from the upper rail 438 (not shown) when the support device 430 is removed, the blocking state of the locking element 402 can be produced by the user by pushing the lower rail 436 into the upper rail 438. For this purpose, the hook 412 is provided with a run-on slope 414 which, during this insertion process, briefly rotates the rotary element 404 counterclockwise against the force of the coil spring 422 and moves the hook arm 410 upwards. When the rails 436 and 438 are pushed together so far that the hook 412 is completely inserted through the opening 440, the spring 422 moves the rotary element 404 clockwise again and brings the hook 412 and thus the locking element 402 into the blocking state of the locking unit 400.

In the state of the rotary element 404 shown in FIG. 19, a lower stop 426 presses against the lower slope 454 of the holding element 450. This prevents the hook arm 410 from being rotated so far that the run-on slope 414 is outside its effective region with respect to the opening 440 in the removed state of the support device 430 and in a state of the locking device 400 in which the hook 412 does not engage in the opening 440. In addition, the lower stop 426 prevents the rotary element 404 from rotating into a position in which the coil spring could fall out of its clamping between the spring arm 416 and the holding element 450.

This embodiment of a support device 430 also has locking devices 400, of which the locking elements 402, when the support device 430 is in a removed state, reliably function both in the usage orientation and in the reverse orientation thereof rotated by 180°.

The invention claimed is:

1. An appliance (2) for a household or for commercial use, for cleaning, storing or cooking items,
   comprising a housing (6) formed by walls (4) spatially surrounding an interior (8), and a support device (430) which is removable from the interior (8),
   wherein the support device (430) comprises at least one rail system (434) with at least two rails (436 and 438) which are connected to one another and movable relative to one another, and at least one support element (432),
   wherein, when the support device (430) is in an installed state, the rail system (434) is mounted on the housing (6) in a force-transmitting manner in such a way that the support element (432) is movable relative to the housing (6) by pulling out the rail system (434),
   wherein a locking unit (400) arranged on the support device (430) and comprising a first locking element (402) is configured to be transferred between a blocking state and a free state,
   wherein, when the support device (430) is in a removed state by being physically separated from the housing (6), the locking unit (400) is in the blocking state, in which the locking element (402) blocks the rail system (434) from being pulled out by forming a positive engagement, and
   wherein, when the support device (430) is in the installed state, the locking unit (400) is in the free state, in which the locking element (402) allows the rail system (434) to be pulled out,
   wherein the locking element (402) is biased against the force of a spring (422) at least in the free state of the locking unit (400).

2. The appliance according to claim 1, further comprising at least one receptacle (14) arranged in a force-transmitting manner on the housing (6) and is configured to receive the support device (430).

3. The appliance according to claim 1, wherein the support element (432) is indirectly or directly associated with an upper one of the two rails (436, 438) of the rail system (434) in a force-transmitting manner (436, 438) of the rail system (434).

4. The appliance according to claim 1, wherein, in the installed state of the support device (430), the locking element (402) is pressed against the force of the spring (422) into the free state of the locking unit (400).

5. The appliance according to claim 1, wherein, the locking element (402) is pressed by the spring (422) into a blocking state of the locking unit (400) in the removed state of the support device (430).

6. The appliance according to claim 1, wherein the locking element (402) comprises a rotatably mounted hook (412).

7. The appliance according to claim 6, wherein the hook (412) is arranged on a first component of the support device (430) and, in the blocking state of the locking unit (400), is latched onto an edge (442) of an opening (440) in a second component of the support device (430).

8. The appliance according to claim 7, wherein the hook (412) is arranged on a first rail (436) of the two rails and the opening (440) is arranged on a second rail (438) of the two rails of the rail system (434).

9. The appliance according to claim 8, wherein the first rail (436) and the hook (412) are directed towards an adjacent side wall (16) of the housing (6).

10. The appliance according to claim 6, wherein the hook (412) has an angle of rotation that is limited in at least one direction of rotation by a stop (424, 426).

11. The appliance according to claim 6, wherein the locking unit (400) comprises an actuating arm (418) which, when the support device (430) is transferred into the installed state, is moved by the housing (6) or a component arranged in a force-transmitting manner on the housing (3) and thereby rotates the hook (412) into the free state of the locking device (400).

12. The appliance according to claim 11, wherein the actuating arm (418) is configured to be moved by an angled portion (460) of a receiving rod (18*a*) of the receptacle (14) and thereby rotates the hook (412) into the free state of the locking device.

13. The appliance according to claim 1, further comprising at least one receptacle (14) arranged in a force-transmitting manner on the housing (6) and configured to receive the support device (430), the receptacle having a bearing surface for the support device (430).

\* \* \* \* \*